United States Patent
Ishii et al.

(10) Patent No.: US 8,081,392 B2
(45) Date of Patent: Dec. 20, 2011

(54) ZOOM LENS

(75) Inventors: Atsujiro Ishii, Shibuya-ku (JP);
Yoshiaki Shimizu, Shibuya-ku (JP)

(73) Assignee: Olympus Imaging Corporation, Tokyo (JP)

(*) Notice: Subject to any disclaimer, the term of this patent is extended or adjusted under 35 U.S.C. 154(b) by 0 days.

(21) Appl. No.: 12/954,095

(22) Filed: Nov. 24, 2010

(65) Prior Publication Data

US 2011/0069396 A1 Mar. 24, 2011

Related U.S. Application Data

(63) Continuation of application No. 11/985,027, filed on Nov. 12, 2007, now abandoned.

(30) Foreign Application Priority Data

Nov. 13, 2006 (JP) .................................. 2006-306587

(51) Int. Cl.
*G02B 15/15* (2006.01)
*G02B 15/14* (2006.01)
(52) U.S. Cl. ......... 359/690; 359/683; 359/684; 359/685
(58) Field of Classification Search .......... 359/683–685, 359/690, 716, 740, 785, 699–701, 704, 819, 359/821–826
See application file for complete search history.

(56) References Cited

U.S. PATENT DOCUMENTS

| | | | |
|---|---|---|---|
| 5,666,230 A | 9/1997 | Tatsuno | |
| 7,061,700 B2* | 6/2006 | Honsho | 359/824 |
| 2002/0114083 A1* | 8/2002 | Cheung | 359/700 |
| 2003/0035224 A1* | 2/2003 | Nishimura et al. | 359/699 |
| 2003/0202262 A1* | 10/2003 | Sasaki et al. | 359/826 |
| 2005/0007680 A1* | 1/2005 | Naganuma et al. | 359/704 |

FOREIGN PATENT DOCUMENTS

JP 2004-341060 12/2004

* cited by examiner

*Primary Examiner* — Evelyn A. Lester
(74) *Attorney, Agent, or Firm* — Kenyon & Kenyon LLP

(57) ABSTRACT

The invention relates to a new mechanism for permitting a zoom lens to focus on a short distance subject by moving a focusing lens group in an amount that varies in an optical axis direction depending on a zooming position. The zoom lens comprises, in order from its object side, a positive first lens group, a negative second lens group and a positive third lens group. Zooming is implemented while the space between adjoining lens groups is varied, and focusing on a short distance subject is implemented by moving the negative second lens group in an amount that varies in the optical axis direction depending on a zooming position. The negative second lens group comprises a negative front unit G2F and a negative rear unit G2R. The space between the negative front unit G2F and the negative rear unit G2R is varied depending on a subject distance but that space remains constant wherever the zooming position lies.

1 Claim, 12 Drawing Sheets

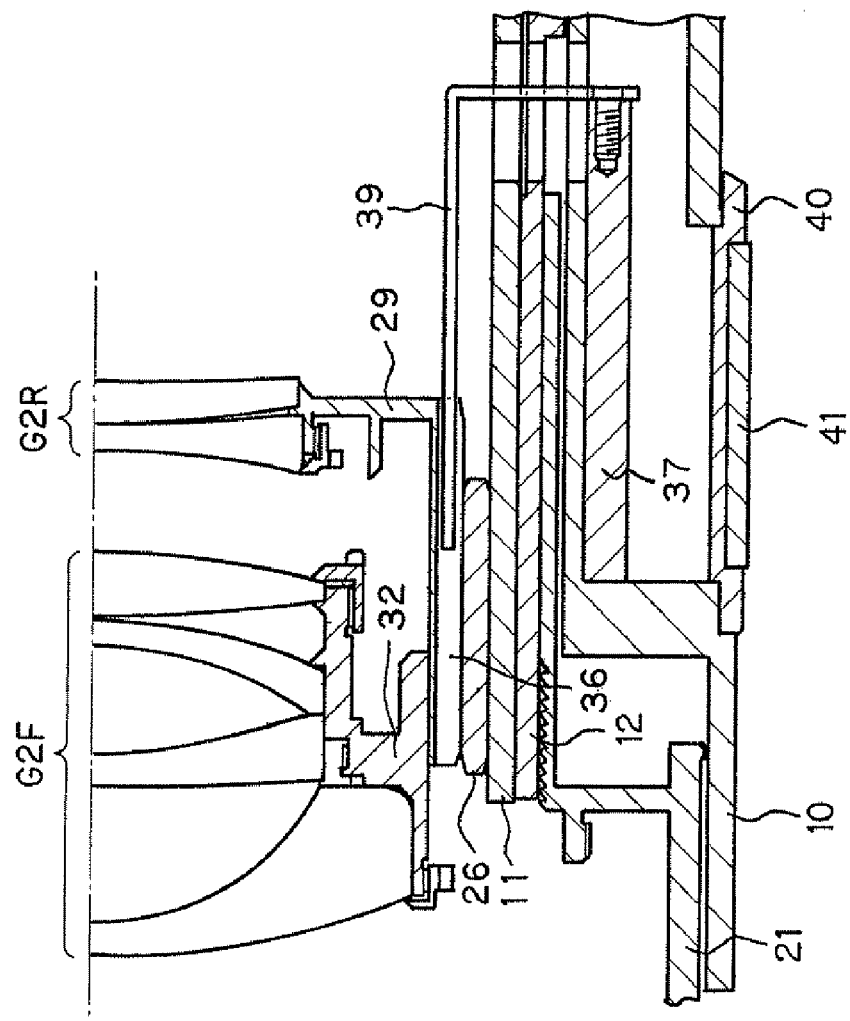

ZOOM LENS

CROSS-REFERENCE TO RELATED APPLICATIONS

This application is a continuation of U.S. patent application Ser. No. 11/985,027 filed on Nov. 12, 2007 now abandoned, which claims priority under 35 U.S.C. §119 to Japanese Application No. 2006-306587 filed on Nov. 13, 2006, each of which is expressly incorporated herein in its entirety by reference thereto.

BACKGROUND OF THE INVENTION

The present invention relates generally to a zoom lens, and more particularly to a zoom lens lending itself to a camera-specific taking lens.

In recent years, there have been growing demands for camera-specific zoom lenses capable of taking photographs both over an ever wider scene through zooming and at an ever wider range of subject distance from infinity to a short distance.

So far, focusing on subjects on short distances has generally been implemented by moving the whole or a part of one lens group among lens groups with the space between them varying at the time of zooming. However, this gives rise to large aberration fluctuations upon focusing that lead to degradations in association with short-distance photography, or is less than satisfactory in terms of much wider short-distance scenes. There has also been the so-called floating mechanism used with single-focus lenses, wherein multiple lens groups are independently moved upon focusing to make correction of aberration fluctuations at short distances, thereby achieving plenty of short-distance performance or the specifications for the shortest distance. For reasons of lens or mechanism size reductions, fast AF, and reductions in the shortest distance, the so-called inner focus mode wherein internal lens groups are driven for focusing goes mainstream for focusing with taking lenses. An example of the floating mechanism of the inner focus mode applied to zoom lenses is set forth in, for instance, Patent Publication 1.

Patent Publication 1
JP(A)2004-341060

A problem with the inner focus mode applied to a zoom lens is, however, that the floating mechanism combined with that gets a lot more complicated, because of changes depending on a zooming position in the amount of movement of a focusing lens group from infinity to a constant subject distance.

SUMMARY OF THE INVENTION

In view of that problem with the prior art as briefed above, an object of the invention is to provide a novel mechanism for a zoom lens designed to focus on a short distance subject by moving a focusing lens group a varying amount in the optical axis direction depending on a zooming position.

According to one aspect of the invention, the aforesaid object is achievable by the provision of a zoom lens adapted to focus on a short distance subject by moving a focusing lens group a varying amount in an optical axis direction depending on a zooming position while there is a change in the space between two lens groups adjacent to each other, characterized in that the space between said two lens groups stays constant at a constant subject distance wherever the zooming position lies.

According to another aspect of the invention, there is a zoom lens provided, which comprises, in order from its object side, a positive first lens group, a negative second lens group and a positive third lens group, wherein zooming is implemented with a change in the space between adjacent lens groups, and said negative second lens group is moved a varying amount in an optical axis direction depending on a zooming position thereby focusing on a short distance subject, and which is characterized in that said negative second lens group comprises a negative front unit and a negative rear unit wherein a space between said negative front unit and said rear unit is varied by a subject distance yet the space between said negative front unit and said negative rear unit stays constant wherever the zooming position lies.

Preferably in this case, at least one lens surface in said front unit is defined by an aspheric surface whose negative or positive power grows weak or strong with a distance from the optical axis, and said rear unit comprises, in order from its object side, a negative lens and a positive lens.

The advantages of, and the requirements for, the aforesaid arrangement are now explained.

To provide a solution to such a problem with the prior art zoom lens as mentioned above—the complexity of the mechanism engendered by the inner focus and floating mechanism combination, the invention provides a zoom lens adapted to focus on a short distance subject by allowing two adjoining lens groups to move a varying amount in the optical axis direction depending on the zooming position while there is a change in the space between them, wherein whatever the subject distance is, the space between the two lens groups stays constant.

Ordinarily, the application of the inner focus mode to a zoom lens requires a cooperating mechanism for moving a focusing lens group to a focusing position in association with zooming, because the amount of movement of the focusing lens group from an infinite position to a constant subject distance differs with focal lengths. Further, a combination of the inner focus mode with the floating mode requires a mechanism in cooperation with the zooming mechanism for each lens group that moves independently upon focusing, making the structure of the lens barrel much more complicated.

In the invention, therefore, the zoom lens is designed such that the space between two lens groups that move independently upon focusing is dependent on the subject distance alone, and two such lens groups move as one piece depending on the focal length, whereby improvements by floating in the short distance performance are achievable without making the mechanism in cooperation with the zooming mechanism complicated.

The invention also provides a zoom lens comprising, in order from its object side, a positive first lens group, a negative second lens group and a positive third lens group, with zooming being implemented while the space between adjacent lens group is varied, and focusing on a short distance subject being implemented by moving the negative second lens group an amount that differs in the optical axis direction depending on a zooming position, wherein the negative second lens group comprises a negative front unit and a negative rear unit, and the space between the negative front unit and the negative rear unit is changed depending on a subject distance while the space between the negative front unit and the negative rear unit stays constant wherever the zooming position lies. It is thus possible to make correction of astigmatism produced when focusing is implemented by the negative second lens group while the space between the front unit and the rear unit stays constant. It is also possible to reduce the size and cost of the whole lens barrel without making the lens barrel structure complicated.

Further, at least one lens surface in the front unit is configured as an aspheric surface having negative or positive power growing weak or strong with a distance from the optical axis so that distortion at the wide-angle end can be well corrected. Furthermore, the negative rear unit is made up of, in order from its object side, a negative lens and a positive lens so that fluctuations of astigmatism likely to occur in association with focusing can be well corrected.

And now, a zoom lens having an angle of view exceeding 70° at the wide-angle end is likely to produce chromatic aberration of magnification, and so chromatic aberration of g line or the like remaining at the time of correction of chromatic aberration near C line and F line in particular, i.e., the so-called secondary spectra are not easy to correct. As well known in the art, such chromatic aberration is corrected by use of fluorite having low dispersion and anomalous dispersion or optical glass having similar characteristics. Chromatic aberration $\Delta_{CF}$ of C line and F line produced at a thin single lens is represented by $$\Delta_{CF} = \Phi/\nu_d$$

Here $\Phi$: the power of the single lens, and
$\nu_d = (n_d-1)/(n_F-n_C)$: the Abbe constant of the material.

The conditions for the achromatization of C line and F line with a doublet consisting of a combined positive and negative lens are $$\Phi = \Phi_1 + \Phi_2, \Phi_1 > 0, \Phi_2 < 0 \quad (1)$$

$$\Delta_{CF} = \Phi_1/\nu_{d1} + \Phi_2/\nu_{d2} = 0 \quad (2)$$

Here $\Phi$: the power of the whole,
$\Phi_i$: the power of the i-th lens, and
$\nu_{di}$: the Abbe constant of the i-th lens. That is, $$\Phi_1 = \nu_{d1}/(\nu_{d1}-\nu_{d2}) \times \Phi \quad (3)$$

$$\Phi_2 = -\nu_{d2}/(\nu_{d1}-\nu_{d2}) \times \Phi \quad (4)$$

From equations (3) and (4), the then residual chromatic aberration $\Delta_{Fg}$ of g line with respect to F line is represented by $$\Delta_{Fg} = \Phi_1 \times \theta_{gF1}/\nu_{d1} + \Phi_2 \times \theta_{gF2}/\nu_{d2} \quad (5)$$
$$= -(\theta_{gF1} - \theta_{gF2})/(\nu_{d1} - \nu_{d2}) \times \Phi$$

$\theta_{gFi} = (n_{gi}-n_{Fi})/(n_{Fi}-n_{Ci})$: the partial dispersion ratio of g line of the i-th lens Thus, it is well known that three wavelengths, C, F, g line, etc. can be achromatized with a combination of two positive and negative lenses having the same $\theta_{gF}$ but varying Abbe constants.

However, the characteristics of most of currently existing glasses are such that $\theta_{gF}$ is almost proportional to $\nu_d$, substantially existing near the straight line of the following equation:

$$\theta_{gF} = -0.001781\nu_d + 0.6494 \quad (6)$$

Therefore, when two glass materials differing in $\nu_d$ are selected, $\theta_{gF}$ comes to differ in proportion to that, too; chromatic aberration of g line remaining in the case of the achromatization of C line and F line with a combination of glass materials existing on the straight line of equation (6) stays constant no matter how they are combined. In general, to correct such secondary spectra, glass materials having characteristics departing from equation (6) or the so-called anomalous dispersion, especially fluorite having low dispersion yet a high partial dispersion ratio or glass materials close in characteristic to it are used. These materials have $\nu_d$ of as large as 80 to 95; when $\Phi > 0$, $\Phi_1 > 0$ and $\Phi_2 < 0$ in the aforesaid achromatism conditions (1) and (2), the perfect achromatization of C line, F line and g line could theoretically be expected if the material for $\Phi_1$ is used in combination with such a material as meeting equations (3) and (4) and $\Phi_{gF1} = \theta_{gF2}$. However, actually available materials capable of meeting $\theta_{gF1} = \theta_{gF2}$ have some limitations on both Abbe constant and refractive index, and with camera-specific taking lenses that must satisfy various specifications for aberration correction, size reductions and other considerations, perfect achromatization would indeed be difficult due to the need of using a material having much higher refractive index and dispersion.

As for a thin lens system made up of n lenses as in equations (2) and (5), the condition for the achromatization of C line and F line is $$\Sigma \Phi_i/\nu_{di} = 0 \quad (7)$$

The then residual chromatic aberration of F line and g line is $$\Sigma \theta_{gFi} \times \Phi_i/\nu_{di} \quad (8)$$

If it is made up of only the material existing on equation (6), from equations (6) and (7), (8) becomes $$\sum \{(-0/001781\nu_{di} + 0.6494) \times \Phi_1/\nu_{di}\} = \quad (9)$$
$$\sum \{(-0001781 + 06494/\nu_{di}) \times \Phi_1\} =$$
$$\sum \{-0.001781 \times \Phi_i\} = -0.001781 \times \Phi$$

It follows that condition (8) is determined by the power of the whole system alone. Consider here the case where the power $\Phi$ of the whole system is positive. Equation (9) becomes negative; so this value may be diminished by using for a lens of positive power a material with partial dispersion larger than given by equation (6). However, when only a material having low dispersion yet a high partial dispersion ratio, like fluorite, is used, $\theta_{gF}$ takes a value of 0.53 to 0.54, and most glass materials on equation (6) have a $\theta_{gF}$ value of greater than 0.54; so from equations (7) and (8), it is noted that unless an optical system is mainly made up of a glass material that is on the equation (6) and has a value of up to 0.54, it is necessary to give large power to a lens made of an anomalous dispersion material so as to make correction of residual chromatic aberration.

Here take achromatization with three lenses as an example. When $$\Phi = \Phi_1 + \Phi_2 \Phi_3, \Phi > 0, \Phi_1, \Phi_3 > 0, \Phi_2 < 0$$

the achromatism condition for C line and F line is $$\Phi_1/\nu_{d1} + \Phi_2/\nu_{d2} + \Phi_3/\nu_{d3} = 0$$

The then residual chromatic aberration of g line with respect to F line is $$\Delta_{Fg} = \theta_{gF1} \times \Phi_1/\nu_{d1} + \theta_{gF2} \times \Phi_2/\nu_{d2} + \theta_{gF3} \times \Phi_3/\nu_{d3}$$

Here the conditions for $\Delta_{Fg} = 0$ are $$\Phi_1 = (\theta_{gF2} - \theta_{gF3}) \times \nu_{d1}/k \times \Phi$$

$$\Phi_2 = (\theta_{gF3} - \theta_{gF1}) \times \nu_{d2}/k \times \Phi$$

$$\Phi_3 = (\theta_{gF1} - \theta_{gF2}) \times \nu_{d3}/k \times \Phi$$

$$k = (\theta_{gF2} - \theta_{gF3}) \times \nu_{d1} + (\theta_{gF3} - \theta_{gF1}) \times \nu_{d2} + (\theta_{gF1} - \theta_{gF2}) \times \nu_{d3}$$

If the three materials are all on equation (6), k=0 or there is no solution. When any one of them is a material having a partial dispersion ratio greater than given by equation (6), for instance, when the material of the lens having power $\Phi_1$ is $$\theta_{gF} = -0.001781\nu_d + 0.6494 + \alpha, \ \alpha > 0$$

$$\Phi_1 = 0.001781 \times \nu_{d1}/\alpha \times \Phi$$

$$\Phi_2 = (\theta_{gF3} - \theta_{gF1}) \times \nu_{d2}/\{(\nu_{d3} - \nu_{d2}) \times \alpha\} \times \Phi$$

$$\Phi_3 = (\theta_{gF1} - \theta_{gF2}) \times \nu_{d3}/\{(\nu_{d3} - \nu_{d2}) \times \alpha\} \times \Phi \quad (10)$$

That is, the value of equation (10) is determined irrespective of the material of $\Phi_2$, $\Phi_3$. For the glass material having low dispersion and anomalous dispersion as expressed by a large $\theta_{gF}$ and used relatively often in view of productivity, cost, etc., for instance, the materials having such characteristics as given by $$n_d = 1.497, \ \nu_d = 81.5, \ \theta_{gF} = 0.537 \quad (1)$$

$$n_d = 1.439, \ \nu_d = 95, \ \theta_{gF} = 0.534 \quad (2)$$

are generally used.

When these are used as the material for $\Phi_1$, the value of $\Phi_1$ (equation (10)) for implementing achromatization at three wavelengths becomes (1) 4.37$\Phi$
(2) 3.15$\Phi$ That is, to make sure perfect achromatization at three wavelengths, it is required to give a power about 3 to 4.5 times as large to the material having lower dispersion and a higher partial dispersion ratio. However, this is often unachievable, because of providing some considerable restrictions on recent camera-specific taking lenses for which higher performance, and further size and cost reductions are needed. Further, for a wide-angle zoom lens or a single lens reflex camera-specific interchangeable zoom lens required to have a long back focus, it is required to apply a high-refractive-index material to a negative lens so as to make correction of a negative Petzval's sum. However, most high-refractive-index materials have high dispersion; so it is difficult to make a sensible tradeoff between achromatization and correction of the Petzval's sum by use of the aforesaid material combination.

On the other hand, it is known that the material having a large $\theta_{gF}$ exceeding the value given by equation (6) includes, in addition to the aforesaid low-dispersion material, a high-dispersion material where $\nu_d \leq 30$. The invention provides a method for implementing achromatization within an entire lens system or zoom lens by use of a combination of the material having such low dispersion yet high partial dispersion ratio as meeting the following condition (a), for instance, fluorite with the material having such high dispersion and high partial dispersion ratio as meeting the following condition (b).

$$\nu_d \geq 80, \ \theta_{gF} \geq -0.001781\nu_d + 0.6494 + 0.02 \quad (a)$$

$$\nu_d \leq 30, \ \theta_{gF} \geq -0.001781\nu_d + 0.6494 + 0.01 \quad (b)$$

For instance, when the material of the aforesaid (1) and (2) is used for $\Phi_1$, the material of $n_d = 1.85$, $\nu_d = 24$ and $\theta_{gF} = 0.62$ is used for $\Phi_2$ and the material of $\nu_d = 30$ according to equation (6) is used for $\Phi_3$, the values of $\Phi_1$, $\Phi_2$ and $\Phi_3$ are $$\Phi_1 = 2.23\Phi, \ \Phi_2 = 1.56\Phi, \ \Phi_3 = -2.79 \quad (1)$$

$$\Phi_1 = 1.93\Phi, \ \Phi_2 = 1.23\Phi, \ \Phi_3 = -2.16 \quad (2)$$

Also, when the material of $n_d = 1.92$, $\nu_d = 18.9$ and $\theta_{gF} = 0.65$ is used for $\Phi_2$, there are $$\Phi_1 = 2.07\Phi, \ \Phi_2 = 0.53\Phi, \ \Phi_3 = -1.60 \quad (1)$$

$$\Phi_1 = 1.82\Phi, \ \Phi_2 = 0.42\Phi, \ \Phi_3 = -1.24 \quad (2)$$

That is, the value of $\Phi_1$ can be smaller than could be obtained with the combination of the aforesaid material of low dispersion and anomalous dispersion with only the material according to equation (6). Further, the material having low dispersion and high refractive index and having a proper negative power can be used for $\Phi_3$, so that there can be a sensible tradeoff offered between achromatization and correction of the Petzval's sum.

While the achromatism conditions for the entire thin lens system have been described, it is understood that much the same principles may be applied to implementing achromatization for the respective groups of a zoom lens, and correction of the secondary spectra of chromatic aberration of magnification likely to occur at a wide-angle zoom lens as well.

Chromatic aberration of magnification is likely to occur with the asymmetric arrangement about an aperture stop of a zoom lens comprising, in order from its object side, a positive first lens group, a negative second lens group, the aperture stop and a lens group located on an image plane side with respect to that and having generally positive power, with zooming implemented while the space between adjacent lens groups is varied, wherein the combined power of the first and second lens groups located on the object side with respect to the aperture stop is negative, and the power of the lens group(s) on the image plane side with respect to the aperture stop is positive. In the invention, therefore, at least two positive lenses using the materials represented by the following conditions (a) and (b) are located in the lens group(s) on the image plane side with respect to the aperture stop so as to make correction of the secondary spectra of chromatic aberration of magnification.

$$\nu_d \geq 80, \ \theta_{gF} \geq -0.001781\nu_d + 0.6494 + 0.02 \quad (a)$$

$$\nu_d \leq 30, \ \theta_{gF} \geq -0.001781\nu_d + 0.6494 + 0.01 \quad (b)$$

Here, $\theta_{gF} = (n_g - n_F)/(n_F - n_C)$ $n_g$: the g-line refractive index
$n_F$: the F-line refractive index
$n_d$: the d-line refractive index
$n_C$: the C-line refractive index For the zoom lens of such construction as described above, it is necessary not only to implement independent achromatization within the positive lens group located on the image plane side with respect to the aperture stop but also to correct the secondary spectra produced at the negative lens group on the object side with respect to the aperture stop; so it is desired to produce the secondary spectra at the positive lens group located on the image plane side with respect to the aperture stop in the opposite direction to normal. In this case, such selection of glass materials as described above becomes much more effective.

That is to say, with the recent progress of digitalized photography, there is a growing demand for how to address image quality degradation engendered by chromatic aberrations. For a zoom lens having an angle of view exceeding 70° at the wide-angle end, there is an increasing demand for further reductions in the chromatic blurring of peripheral images caused by chromatic aberration of magnification in particular. So far, making correction of the secondary spectra using fluorite having low dispersion and anomalous dispersion or glass close to it has been well known; however, there is still a limit to that.

This problem is solved by the following embodiments.

[1] A zoom lens, comprising a plurality of lens groups in which the space between them is varied for zooming, characterized in that at least one of said plurality of lens groups comprises at least two lenses made of two materials that meet the two following conditions and having the same sign:

$$\nu_d \geq 80, \theta_{gF} \geq -0.001781\nu_d + 0.6494 + 0.02 \quad (a)$$

$$\nu_d \leq 30, \theta_{gF} \geq -0.001781\nu_d + 0.6494 + 0.01 \quad (b)$$

where:

$$\theta_{gF} = (n_g - n_F)/(n_F - n_C),$$

$n_g$: the g-line refractive index,
$n_F$: the F-line refractive index,
$n_d$: the d-line refractive index, and
$n_C$: the C-line refractive index.

[2] A zoom lens having an angle of view of at least 70° at a wide-angle end, comprising, in order from its object side, a positive first lens group, a negative second lens group, an aperture stop, and a lens group having generally positive power on an image plane side with respect to that, in which zooming is implemented while the space between adjoining lens groups is varied, characterized by further comprising on an image plane side with respect to said aperture stop at least two lenses formed of two materials that meet two following conditions and having the same sign:

$$\nu_d \geq 80, \theta_{gF} \geq -0.001781\nu_d + 0.6494 + 0.02 \quad (a)$$

$$\nu_d \leq 30, \theta_{gF} \geq -0.001781\nu_d + 0.6494 + 0.01 \quad (b)$$

where:

$$\theta_{gF} = (n_g - n_F)/(n_F - n_C),$$

$n_g$: the g-line refractive index,
$n_F$: the F-line refractive index,
$n_d$: the d-line refractive index, and
$n_C$: the C-line refractive index.

In the invention, the space between two independently moving lenses groups is made dependent on the subject distance alone, and two such lens groups move as one single piece depending on the focal length, so that improvements in the short-distance performance are achievable by floating without making a mechanism in cooperation with the zoom mechanism complicated.

Still objects and advantages of the invention will be in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 11 is illustrative in section including the optical axis of the barrel portion for the second group at an angular position different from that in FIG. 10.

DESCRIPTION OF THE PREFERRED EMBODIMENTS

Figure 1A:
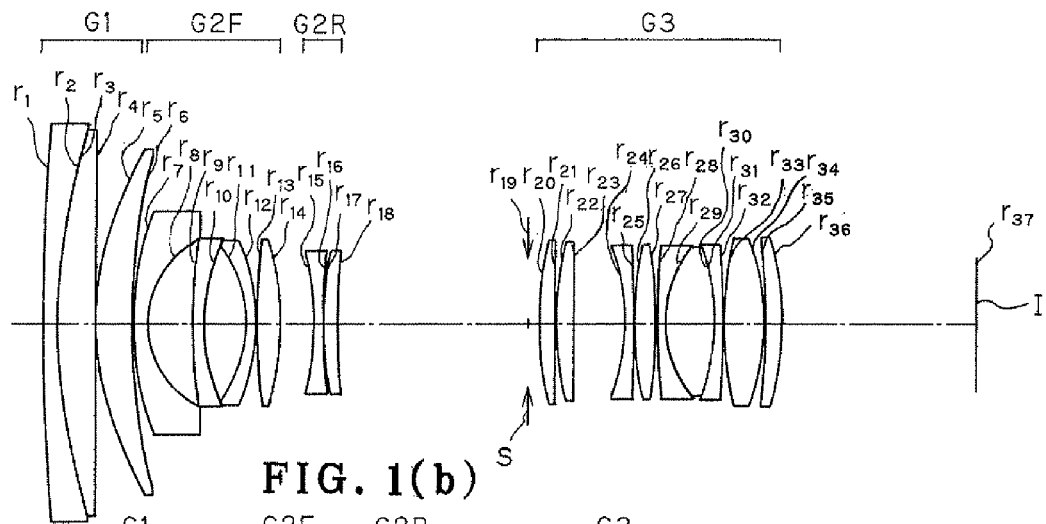
FIG. 1 is illustrative in lens section of Example 1 of the zoom lens according to the invention at the wide-angle end (a), in the intermediate state (b) and at the telephoto end (c) upon focusing on an object point at infinity.
Figure 1B:
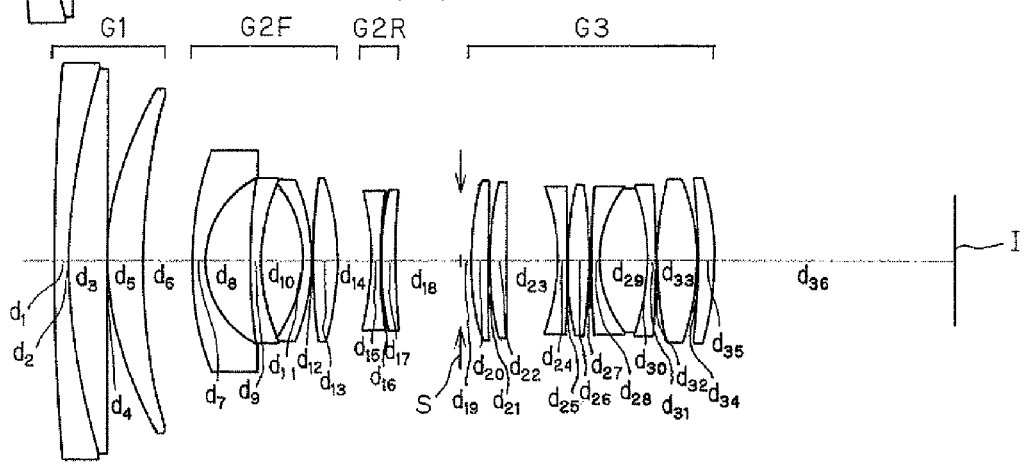
Figure 1C:
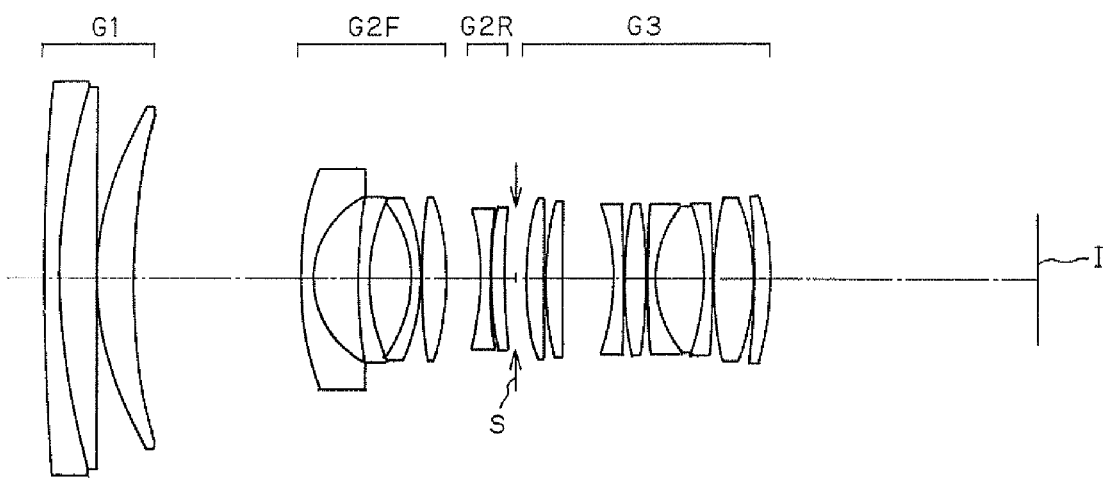
Figure 2A:
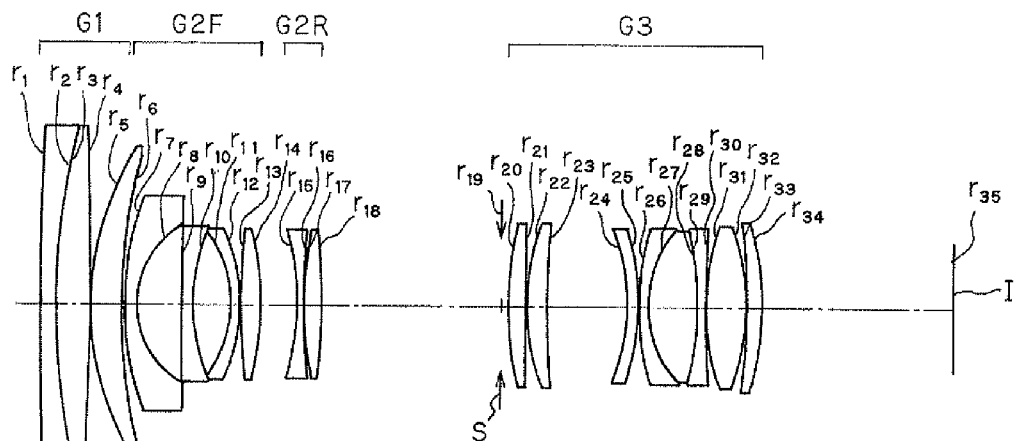
FIG. 2 is illustrative, as in FIG. 1, of Example 2 of the zoom lens according to the invention.
Figure 2B:
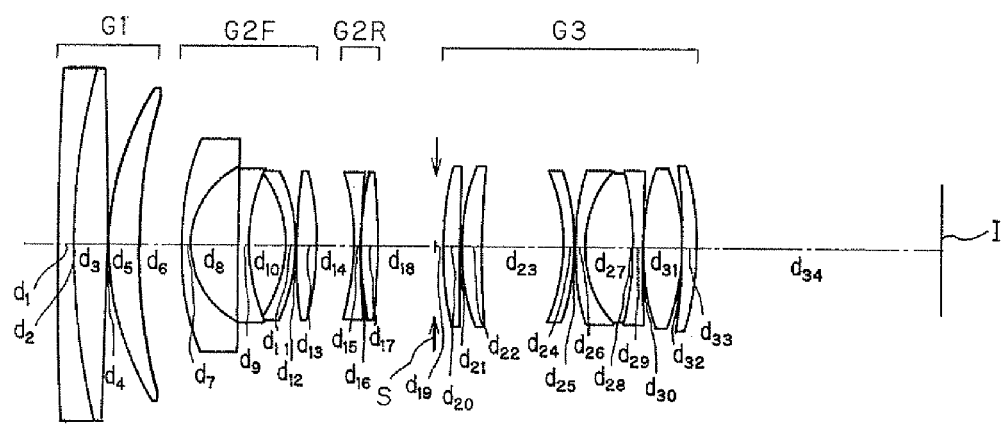
Figure 2C:
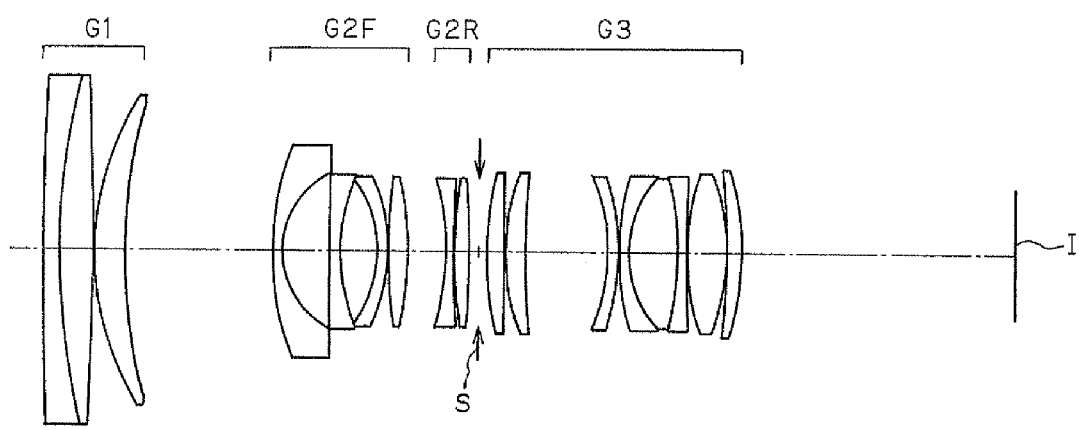
Figure 3A:
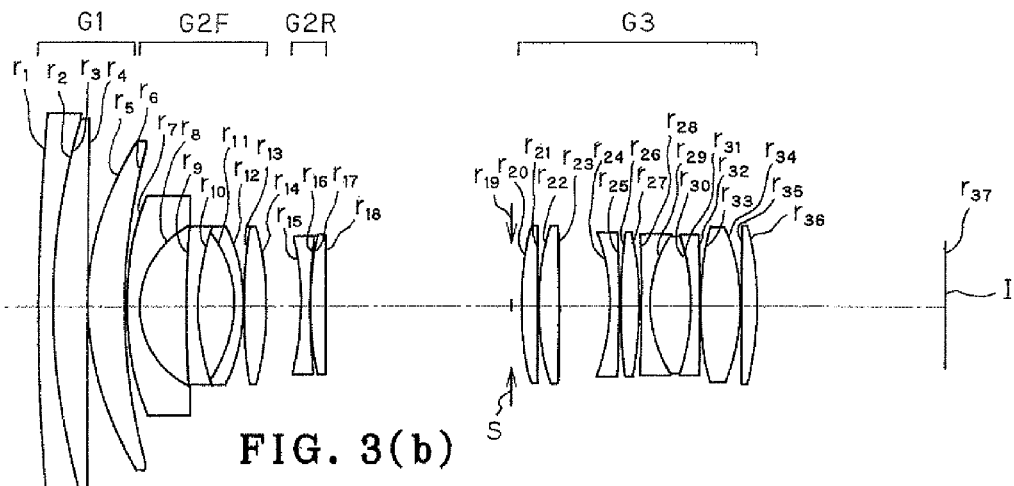
FIG. 3 is illustrative, as in FIG. 1, of Example 3 of the zoom lens according to the invention.
Figure 3B:
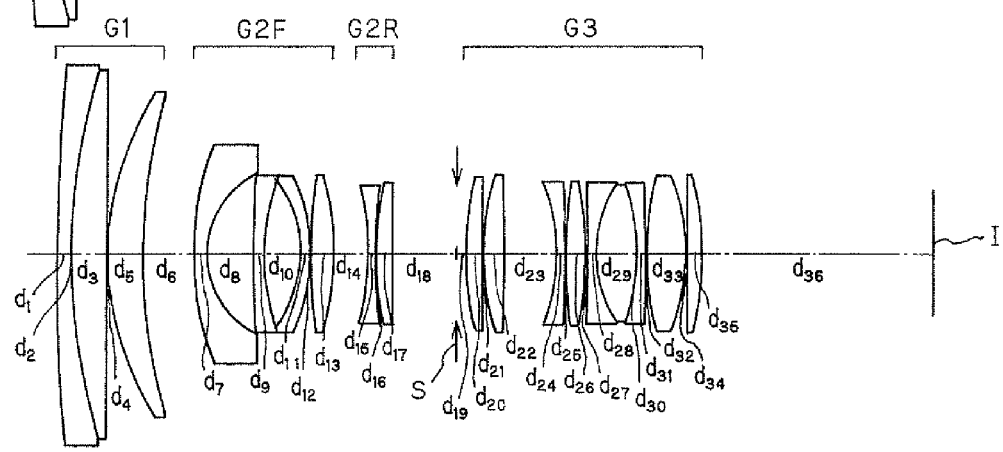
Figure 3C:
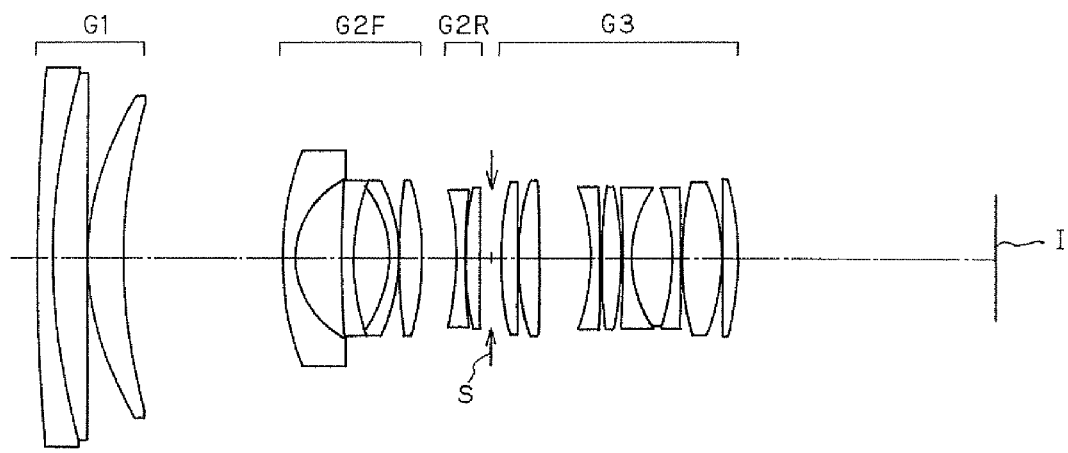

The zoom lens of the invention is now explained with reference to Examples 1, 2 and 3. FIGS. 1, 2, and 3 is illustrative in lens section of Example 1, 2, and 3, respectively, at the wide-angle end (a), in the intermediate state (b), and at the telephoto end (c) upon focusing on an object point at infinity. In each drawing, G1 is indicative of the first lens group, G2F the front unit of the second lens group, G2R the rear unit of the second lens group, S an aperture stop, G3 the third lens group, and I the image plane.

EXAMPLE 1

As shown in FIG. 1, Example 1 is directed to a zoom lens made up of, in order from its object side, the first lens group G1 having positive power, the negative power front unit G2F of the second lens group having negative power, the negative power rear unit G2R of the second lens group having negative power, the aperture stop S and the third lens group G3 having positive power. Upon zooming from the wide-angle end to the telephoto end, the first lens group G1 moves on a concave locus toward the object side, and is positioned more on the object side at the telephoto end than at the wide-angle end, and the front G2F and rear unit G2R of the second lens group G2 move together toward the image side. The aperture stop S and the third lens group G3 move together toward the object side. It is here noted that the locus of movement upon zooming of the second lens group G2 made up of the front G2F and the rear unit G2R varies depending on the subject distance (the distance from the subject to the image plane I).

Upon focusing from infinity to a short distance, the front G2F and the rear unit G2R of the second lens group move in a direction of the space between them becoming narrow, and that space depends on the subject distance but does not on a zooming position (the focal length).

In order from the object side, the first lens group G1 is made up of a negative meniscus lens convex on its object side and two positive meniscus lenses, each convex on its object side; the front unit G2F of the second lens group G2 is made up of two negative meniscus lenses each convex on its object side, a negative meniscus lens convex on its image side and a double-convex positive lens; the rear unit G2R of the second lens group G2 is made up of a double-concave negative lens and a positive meniscus lens convex on its object side; and the third lens group G3 is made up of a positive meniscus lens convex on its object side, a double-convex positive lens, a negative meniscus lens convex on its image side, a double-convex positive lens, a cemented lens of a negative meniscus lens convex on its object side and a double-convex positive lens, a negative meniscus lens convex on its image side, a double-convex positive lens and a positive meniscus lens convex on its image side.

Four aspheric surfaces are used: two at both surfaces of the second negative meniscus lens in the front unit G2F of the second lens group G2, and two at both surfaces of the double-convex positive lens located in the third lens group G3 and nearest to its image side.

EXAMPLE 2

As shown in FIG. 2, Example 2 is directed to a zoom lens made up of, in order from its object side, the first lens group G1 having positive power, the negative power front unit G2F of the second lens group having negative power, the negative power rear unit G2R of the second lens group having negative power, the aperture stop S and the third lens group G3 having positive power. Upon zooming from the wide-angle end to the telephoto end, the first lens group G1 moves on a concave locus toward the object side, and is positioned more on the object side at the telephoto end than at the wide-angle end, and the front G2F and rear unit G2R of the second lens group G2 move together toward the image side. The aperture stop S and the third lens group G3 move together toward the object side. It is here noted that the locus of movement upon zooming of the second lens group G2 made up of the front G2F and the rear unit G2R varies depending on the subject distance (the distance from the subject to the image plane I).

Upon focusing from infinity to a short distance, the front G2F and the rear unit G2R of the second lens group move in a direction of the space between them becoming narrow, and that space depends on the subject distance but does not on a zooming position (the focal length).

In order from the object side, the first lens group G1 is made up of a negative meniscus lens convex on its object side, a double-convex positive lens and a positive meniscus lenses convex on its object side; the front unit G2F of the second lens group G2 is made up of two negative meniscus lenses each convex on its object side, a negative meniscus lens convex on its image side and a double-convex positive lens; the rear unit G2R of the second lens group G2 is made up of a double-concave negative lens and a double-convex positive lens; and the third lens group G3 is made up of two positive meniscus lenses each convex on its object side, a negative meniscus lens convex on its image side, a cemented lens of a negative meniscus lens convex on its object side and a double-convex positive lens, a double-concave negative lens, a double-convex positive lens, and a positive meniscus lens convex on its image side.

Four aspheric surfaces are used: two at both surfaces of the second negative meniscus lens in the front unit G2F of the second lens group G2, and two at both surfaces of the double-convex positive lens located in the third lens group G3 and nearest to its image side.

EXAMPLE 3

As shown in FIG. 3, Example 3 is directed to a zoom lens made up of, in order from its object side, the first lens group G1 having positive power, the negative power front unit G2F of the second lens group having negative power, the negative power rear unit G2R of the second lens group having negative power, the aperture stop S and the third lens group G3 having positive power. Upon zooming from the wide-angle end to the telephoto end, the first lens group G1 moves on a concave locus toward the object side, and is positioned more on the object side at the telephoto end than at the wide-angle end, and the front G2F and rear unit G2R of the second lens group G2 move together toward the image side. The aperture stop S and the third lens group G3 move together toward the object side. It is here noted that the locus of movement upon zooming of the second lens group G2 made up of the front G2F and the rear unit G2R varies depending on the subject distance (the distance from the subject to the image plane I).

Upon focusing from infinity to a short distance, the front G2F and the rear unit G2R of the second lens group move in a direction of the space between them becoming narrow, and that space depends on the subject distance but does not on a zooming position (the focal length).

In order from the object side, the first lens group G1 is made up of a negative meniscus lens convex on its object side, a plano-convex positive lens and a positive meniscus lens convex on its object side; the front unit G2F of the second lens group G2 is made up of two negative meniscus lenses each convex on its object side, a negative meniscus lens convex on its image side and a double-convex positive lens; the rear unit G2R of the second lens group G2 is made up of a double-concave negative lens and a positive meniscus lens convex on its object side; and the third lens group G3 is made up of a positive meniscus lens convex on its object side, a double-convex positive lens, a negative meniscus lens convex on its image side, a double-convex positive lens, a cemented lens of a double-concave negative lens and a double-convex positive lens, a negative meniscus lens convex on its image side, a double-convex positive lens and a positive meniscus lens convex on its image side.

Four aspheric surfaces are used: two at both surfaces of the second negative meniscus lens in the front unit G2F of the second lens group G2, and two at both surfaces of the double-convex positive lens located in the third lens group G3 and nearest to its image side.

In what follows, numerical data about each example are enumerated below, but symbols used hereinafter but not hereinbefore have the following meanings.

f: the focal length of the whole optical system,

F: the F-number,

ω: the half angle of view,

WE: the wide-angle end,

ST: the intermediate state,

TE: the telephoto end, $r_1, r_2, \ldots$: the radius of curvature of each lens surface, $d_1, d_2, \ldots$: the space between the adjacent lens surface, $n_{d1}, n_{d2}, \ldots$: the d-line refractive index of each lens, and $v_{d1}, v_{d2}, \ldots$: the Abbe constant of each lens.

The bracketed figures after WE, ST and TE are the subject distances (mm) as measured from the image plane. Here suppose x and y to be an optical axis provided that the direction of travel of light is taken as positive and a direction orthogonal to that optical axis. Then, aspheric surface shape is given by $$x=(y^2/r)/[1+\{1-(K+1)(y/r)^2\}^{1/2}]+A_4y^4+A_6y^6+A_8y^8+A_{10}y^{10}$$

Here r is the paraxial radius of curvature, K is the conical coefficient, and $A_4, A_6, A_8$ and $A_{10}$ are the $4^{th}$-, $6^{th}$-, $8^{th}$- and $10^{th}$-order aspheric coefficients.

EXAMPLE 1

| | | | |
|---|---|---|---|
| $r_1 = 387.355$ | $d_1 = 2.63$ | $n_{d1} = 1.84666$ | $\nu_{d1} = 23.78$ |
| $r_2 = 111.767$ | $d_2 = 0.01$ | | |
| $r_3 = 111.356$ | $d_3 = 6.47$ | $n_{d2} = 1.77250$ | $\nu_{d2} = 49.60$ |
| $r_4 = 3365.600$ | $d_4 = 0.20$ | | |
| $r_5 = 57.289$ | $d_5 = 5.97$ | $n_{d3} = 1.77250$ | $\nu_{d3} = 49.60$ |
| $r_6 = 111.018$ | $d_6 = $ (Variable) | | |
| $r_7 = 58.091$ | $d_7 = 2.01$ | $n_{d4} = 1.88300$ | $\nu_{d4} = 40.76$ |
| $r_8 = 15.990$ | $d_8 = 8.04$ | | |
| $r_9 = 102.838$ (Aspheric) | $d_9 = 1.92$ | $n_{d5} = 1.58313$ | $\nu_{d5} = 59.38$ |
| $r_{10} = 26.644$ (Aspheric) | $d_{10} = 7.47$ | | |
| $r_{11} = -22.460$ | $d_{11} = 1.62$ | $n_{d6} = 1.48749$ | $\nu_{d6} = 70.23$ |
| $r_{12} = -36.701$ | $d_{12} = 0.15$ | | |
| $r_{13} = 100.700$ | $d_{13} = 4.32$ | $n_{d7} = 1.84666$ | $\nu_{d7} = 23.78$ |
| $r_{14} = -50.637$ | $d_{14} = $ (Variable) | | |
| $r_{15} = -52.349$ | $d_{15} = 1.61$ | $n_{d8} = 1.59469$ | $\nu_{d8} = 32.36$ |
| $r_{16} = 72.901$ | $d_{16} = 0.15$ | | |
| $r_{17} = 60.892$ | $d_{17} = 2.70$ | $n_{d9} = 1.81454$ | $\nu_{d9} = 38.95$ |
| $r_{18} = 173.601$ | $d_{18} = $ (Variable) | | |
| $r_{19} = \infty$ (Stop) | $d_{19} = 1.70$ | | |
| $r_{20} = 49.288$ | $d_{20} = 3.09$ | $n_{d10} = 1.60753$ | $\nu_{d10} = 34.16$ |
| $r_{21} = 503.698$ | $d_{21} = 0.15$ | | |
| $r_{22} = 51.547$ | $d_{22} = 3.21$ | $n_{d11} = 1.60280$ | $\nu_{d11} = 47.85$ |
| $r_{23} = -934.636$ | $d_{23} = 8.85$ | | |
| $r_{24} = -38.354$ | $d_{24} = 1.78$ | $n_{d12} = 1.52117$ | $\nu_{d12} = 45.51$ |
| $r_{25} = -1291.613$ | $d_{25} = 0.01$ | | |
| $r_{26} = 54.193$ | $d_{26} = 3.95$ | $n_{d13} = 1.49700$ | $\nu_{d13} = 81.54$ |
| $r_{27} = -95.019$ | $d_{27} = 0.28$ | | |
| $r_{28} = 170.410$ | $d_{28} = 1.60$ | $n_{d14} = 1.68893$ | $\nu_{d14} = 31.08$ |
| $r_{29} = 20.026$ | $d_{29} = 8.23$ | $n_{d15} = 1.43875$ | $\nu_{d15} = 94.93$ |
| $r_{30} = -44.268$ | $d_{30} = 0.20$ | | |
| $r_{31} = -37.935$ | $d_{31} = 1.59$ | $n_{d16} = 1.90366$ | $\nu_{d16} = 31.31$ |
| $r_{32} = -300.910$ | $d_{32} = 0.22$ | | |
| $r_{33} = 50.668$ (Aspheric) | $d_{33} = 7.09$ | $n_{d17} = 1.49700$ | $\nu_{d17} = 81.54$ |
| $r_{34} = -36.662$ (Aspheric) | $d_{34} = 0.15$ | | |
| $r_{35} = -125.640$ | $d_{35} = 2.83$ | $n_{d18} = 1.84666$ | $\nu_{d18} = 23.78$ |
| $r_{36} = -53.971$ | $d_{36} = $ (Variable) | | |
| $r_{37} = \infty$ (Imaging plane) | | | |

Aspherical Coefficients

9th surface $K = 0.000$
$A_4 = 1.73390 \times 10^{-5}$
$A_6 = -9.68245 \times 10^{-8}$
$A_8 = 3.34280 \times 10^{-10}$
$A_{10} = -8.36705 \times 10^{-13}$ 10th surface $K = 0.000$
$A_4 = 1.02609 \times 10^{-6}$
$A_6 = -1.24880 \times 10^{-7}$
$A_8 = 2.22314 \times 10^{-10}$
$A_{10} = -9.85649 \times 10^{-13}$ 33th surface $K = 0.000$
$A_4 = -8.54265 \times 10^{-6}$
$A_6 = 5.69449 \times 10^{-9}$
$A_8 = 2.26533 \times 10^{-11}$
$A_{10} = -3.21043 \times 10^{-14}$ 34th surface $K = 0.000$
$A_4 = 6.17864 \times 10^{-6}$
$A_6 = -8.70372 \times 10^{-9}$
$A_8 = 4.10560 \times 10^{-11}$
$A_{10} = -5.71444 \times 10^{-14}$ Zooming Data

| | WE($\infty$) | ST($\infty$) | TE($\infty$) | WE(750) | ST(750) | TE(750) |
|---|---|---|---|---|---|---|
| f (mm) | 14.21 | 22.9 | 34.25 | 14.26 | 21.89 | 32.70 |
| $F_{NO}$ | 2.05 | 2.06 | 2.04 | 2.04 | 2.05 | 2.02 |
| $2\omega$ (°) | 77.41 | 53.55 | 35.77 | 77.10 | 53.83 | 37.04 |
| $d_6$ | 0.60 | 8.71 | 29.13 | 1.36 | 9.27 | 28.77 |
| $d_{14}$ | 5.78 | 5.78 | 5.78 | 3.27 | 3.27 | 3.27 |

-continued

| | | | | | | |
|---|---|---|---|---|---|---|
| $d_{18}$ | 33.16 | 11.13 | 1.84 | 34.91 | 13.08 | 4.72 |
| $d_{36}$ | 33.77 | 41.85 | 46.61 | 33.78 | 41.85 | 46.63 |

| | $\theta_{gF}$ | $\theta_{gF}$-formula (6) |
|---|---|---|
| $n_{d13}, n_{d17}$ | 0.537 | 0.033 |
| $n_{d15}$ | 0.534 | 0.054 |
| $n_{d18}$ | 0.620 | 0.013 |

EXAMPLE 2

| | | | |
|---|---|---|---|
| $r_1$ = 731.588 | $d_1$ = 2.63 | $n_{d1}$ = 1.84666 | $v_{d1}$ = 23.78 |
| $r_2$ = 126.803 | $d_2$ = 0.20 | | |
| $r_3$ = 127.949 | $d_3$ = 5.82 | $n_{d2}$ = 1.77250 | $v_{d2}$ = 49.60 |
| $r_4$ = −685.027 | $d_4$ = 0.20 | | |
| $r_5$ = 51.823 | $d_5$ = 5.21 | $n_{d3}$ = 1.77250 | $v_{d3}$ = 49.60 |
| $r_6$ = 98.011 | $d_6$ = (Variable) | | |
| $r_7$ = 52.780 | $d_7$ = 1.82 | $n_{d4}$ = 1.88300 | $v_{d4}$ = 40.76 |
| $r_8$ = 15.474 | $d_8$ = 8.29 | | |
| $r_9$ = 300.548 (Aspheric) | $d_9$ = 1.90 | $n_{d5}$ = 1.58313 | $v_{d5}$ = 59.38 |
| $r_{10}$ = 25.874 (Aspheric) | $d_{10}$ = 6.79 | | |
| $r_{11}$ = −21.402 | $d_{11}$ = 1.64 | $n_{d6}$ = 1.49700 | $v_{d6}$ = 81.54 |
| $r_{12}$ = −31.787 | $d_{12}$ = 0.15 | | |
| $r_{13}$ = 97.342 | $d_{13}$ = 3.54 | $n_{d7}$ = 1.84666 | $v_{d7}$ = 23.78 |
| $r_{14}$ = −57.944 | $d_{14}$ = (Variable) | | |
| $r_{15}$ = −53.518 | $d_{15}$ = 1.68 | $n_{d8}$ = 1.88300 | $v_{d8}$ = 40.76 |
| $r_{16}$ = 249.374 | $d_{16}$ = 0.15 | | |
| $r_{17}$ = 131.919 | $d_{17}$ = 2.57 | $n_{d9}$ = 1.78590 | $v_{d9}$ = 44.20 |
| $r_{18}$ = −160.127 | $d_{18}$ = (Variable) | | |
| $r_{19}$ = ∞ (Stop) | $d_{19}$ = 1.50 | | |
| $r_{20}$ = 67.896 | $d_{20}$ = 2.89 | $n_{d10}$ = 1.88300 | $v_{d10}$ = 40.76 |
| $r_{21}$ = 1475.243 | $d_{21}$ = 0.15 | | |
| $r_{22}$ = 37.278 | $d_{22}$ = 3.65 | $n_{d11}$ = 1.49700 | $v_{d11}$ = 81.54 |
| $r_{23}$ = 150.000 | $d_{23}$ = 14.37 | | |
| $r_{24}$ = −34.316 | $d_{24}$ = 1.90 | $n_{d12}$ = 1.86099 | $v_{d12}$ = 22.46 |
| $r_{25}$ = −44.544 | $d_{25}$ = 0.29 | | |
| $r_{26}$ = 47.997 | $d_{26}$ = 1.60 | $n_{d13}$ = 1.68893 | $v_{d13}$ = 31.08 |
| $r_{27}$ = 18.729 | $d_{27}$ = 8.67 | $n_{d14}$ = 1.43875 | $v_{d14}$ = 94.93 |
| $r_{28}$ = −58.800 | $d_{28}$ = 0.16 | | |
| $r_{29}$ = −54.295 | $d_{29}$ = 1.67 | $n_{d15}$ = 2.00330 | $v_{d15}$ = 28.27 |
| $r_{30}$ = 250.000 | $d_{30}$ = 0.15 | | |
| $r_{31}$ = 38.844 (Aspheric) | $d_{31}$ = 6.97 | $n_{d16}$ = 1.49700 | $v_{d16}$ = 81.54 |
| $r_{32}$ = −38.588 (Aspheric) | $d_{32}$ = 0.15 | | |
| $r_{33}$ = −105.622 | $d_{33}$ = 2.57 | $n_{d17}$ = 1.92286 | $v_{d17}$ = 18.90 |
| $r_{34}$ = −52.369 | $d_{34}$ = (Variable) | | |
| $r_{35}$ = ∞ (Imaging plane) | | | |

Aspherical Coefficients

9th surface $K = 0.000$
$A_4 = 7.49104 \times 10^{-6}$
$A_6 = -6.68652 \times 10^{-8}$
$A_8 = 2.18412 \times 10^{-10}$
$A_{10} = -7.28168 \times 10^{-13}$ 10th surface $K = 0.000$
$A_4 = -1.14035 \times 10^{-5}$
$A_6 = -8.77809 \times 10^{-8}$
$A_8 = 4.80848 \times 10^{-11}$
$A_{10} = -4.71742 \times 10^{-13}$ 31th surface $K = 0.000$
$A_4 = -1.11257 \times 10^{-5}$
$A_6 = 1.23604 \times 10^{-8}$
$A_8 = -3.55905 \times 10^{-11}$
$A_{10} = 5.54826 \times 10^{-14}$ 32th surface $K = 0.000$
$A_4 = 4.79552 \times 10^{-6}$
$A_6 = -5.36425 \times 10^{-9}$ -continued $A_8 = -1.84054 \times 10^{-12}$
$A_{10} = -4.74223 \times 10^{-14}$ Zooming Data

|  | WE(∞) | ST(∞) | TE(∞) | WE(370) | sT(370) | TE(370) |
|---|---|---|---|---|---|---|
| f (mm) | 14.25 | 22.16 | 34.01 | 14.30 | 21.74 | 31.13 |
| $F_{NO}$ | 2.05 | 2.06 | 2.04 | 2.04 | 2.03 | 1.99 |
| $2_w$ (°) | 77.36 | 53.53 | 35.97 | 76.90 | 54.07 | 38.27 |
| $d_6$ | 0.56 | 7.37 | 25.87 | 1.56 | 8.18 | 25.02 |
| $d_{14}$ | 6.41 | 6.41 | 6.41 | 0.63 | 0.63 | 0.63 |
| $d_{18}$ | 31.67 | 10.07 | 1.59 | 36.43 | 15.05 | 8.22 |
| $d_{34}$ | 33.72 | 43.08 | 48.15 | 33.73 | 43.12 | 48.14 |

|  | $\theta_{gF}$ | $\theta_{gF}$-formula (6) |
|---|---|---|
| $n_{d11}$ | 0.537 | 0.033 |
| $n_{d14}$ | 0.534 | 0.054 |
| $n_{d17}$ | 0.649 | 0.034 |

EXAMPLE 3

| | | | |
|---|---|---|---|
| $r_1 = 388.432$ | $d_1 = 2.63$ | $n_{d1} = 1.84666$ | $v_{d1} = 23.78$ |
| $r_2 = 116.328$ | $d_2 = 0.19$ | | |
| $r_3 = 120.478$ | $d_3 = 6.23$ | $n_{d2} = 1.77250$ | $v_{d2} = 49.60$ |
| $r_4 = \infty$ | $d_4 = 0.20$ | | |
| $r_5 = 55.418$ | $d_5 = 6.31$ | $n_{d3} = 1.77250$ | $v_{d3} = 49.60$ |
| $r_6 = 106.616$ | $d_6 = $ (Variable) | | |
| $r_7 = 58.092$ | $d_7 = 2.01$ | $n_{d4} = 1.88300$ | $v_{d4} = 40.76$ |
| $r_8 = 15.659$ | $d_8 = 8.62$ | | |
| $r_9 = 499.999$ (Aspheric) | $d_9 = 1.92$ | $n_{d5} = 1.58253$ | $v_{d5} = 59.32$ |
| $r_{10} = 31.329$ (Aspheric) | $d_{10} = 6.88$ | | |
| $r_{11} = -22.540$ | $d_{11} = 1.62$ | $n_{d6} = 1.48749$ | $v_{d6} = 70.23$ |
| $r_{12} = -34.382$ | $d_{12} = 0.15$ | | |
| $r_{13} = 109.408$ | $d_{13} = 4.13$ | $n_{d7} = 1.84666$ | $v_{d7} = 23.78$ |
| $r_{14} = -52.304$ | $d_{14} = $ (Variable) | | |
| $r_{15} = -53.386$ | $d_{15} = 1.61$ | $n_{d8} = 1.62004$ | $v_{d8} = 36.26$ |
| $r_{16} = 90.446$ | $d_{16} = 0.15$ | | |
| $r_{17} = 74.131$ | $d_{17} = 2.68$ | $n_{d9} = 1.78590$ | $v_{d9} = 44.20$ |
| $r_{18} = 577.522$ | $d_{18} = $ (Variable) | | |
| $r_{19} = \infty$ (Stop) | $d_{19} = 1.70$ | | |
| $r_{20} = 54.962$ | $d_{20} = 2.98$ | $n_{d10} = 1.63980$ | $v_{d10} = 34.46$ |
| $r_{21} = 477.175$ | $d_{21} = 0.15$ | | |
| $r_{22} = 44.882$ | $d_{22} = 3.94$ | $n_{d11} = 1.62280$ | $v_{d11} = 57.05$ |
| $r_{23} = -400.001$ | $d_{23} = 9.25$ | | |
| $r_{24} = -37.960$ | $d_{24} = 1.79$ | $n_{d12} = 1.57501$ | $v_{d12} = 41.50$ |
| $r_{25} = -300.000$ | $d_{25} = 0.15$ | | |
| $r_{26} = 90.287$ | $d_{26} = 3.53$ | $n_{d13} = 1.49700$ | $v_{d13} = 81.54$ |
| $r_{27} = -67.879$ | $d_{27} = 0.29$ | | |
| $r_{28} = -1026.371$ | $d_{28} = 1.60$ | $n_{d14} = 1.68893$ | $v_{d14} = 31.08$ |
| $r_{29} = 21.042$ | $d_{29} = 7.45$ | $n_{d15} = 1.43875$ | $v_{d15} = 94.93$ |
| $r_{30} = -44.725$ | $d_{30} = 0.17$ | | |
| $r_{31} = -40.315$ | $d_{31} = 1.59$ | $n_{d16} = 1.90366$ | $v_{d16} = 31.31$ |
| $r_{32} = -1452.783$ | $d_{32} = 0.15$ | | |
| $r_{33} = 45.448$ (Aspheric) | $d_{33} = 7.46$ | $n_{d17} = 1.49640$ | $v_{d17} = 81.24$ |
| $r_{34} = -36.320$ (Aspheric) | $d_{34} = 0.15$ | | |
| $r_{35} = -2245.818$ | $d_{35} = 2.90$ | $n_{d18} = 1.63494$ | $v_{d18} = 23.22$ |
| $r_{36} = -56.553$ | $d_{36} = $ (Variable) | | |
| $r_{37} = \infty$ (Imaging plane) | | | |

Aspherical Coefficients

9th surface $K = 0.000$
$A_4 = 2.33955 \times 10^{-5}$
$A_6 = -1.46412 \times 10^{-7}$
$A_8 = 5.37937 \times 10^{-10}$
$A_{10} = -1.32462 \times 10^{-12}$ 10th surface $K = 0.000$
$A_4 = 7.38718 \times 10^{-6}$
$A_6 = -1.66142 \times 10^{-7}$ -continued $A_8 = 3.75503 \times 10^{-10}$
$A_{10} = -1.27423 \times 10^{-12}$ 33th surface $K = 0.000$
$A_4 = -1.05652 \times 10^{-5}$
$A_6 = 6.57981 \times 10^{-10}$
$A_8 = 4.92273 \times 10^{-11}$
$A_{10} = -8.47219 \times 10^{-14}$ 34th surface $K = 0.000$
$A_4 = 4.57324 \times 10^{-6}$
$A_6 = -1.30667 \times 10^{-8}$
$A_8 = 5.78315 \times 10^{-11}$
$A_{10} = -9.06114 \times 10^{-14}$ Zooming Data

|  | WE(∞) | ST(∞) | TE(∞) | WE(350) | ST(350) | TE(350) |
|---|---|---|---|---|---|---|
| f (mm) | 14.22 | 22.08 | 34.28 | 13.95 | 21.04 | 30.04 |
| $F_{NO}$ | 2.04 | 2.04 | 2.04 | 2.03 | 2.01 | 1.99 |
| $2_w$ (°) | 77.45 | 53.63 | 35.87 | 78.51 | 55.55 | 39.57 |
| $d_6$ | 0.60 | 9.28 | 28.72 | 0.76 | 9.09 | 26.50 |
| $d_{14}$ | 6.20 | 6.20 | 6.20 | 0.85 | 0.85 | 0.85 |
| $d_{18}$ | 33.99 | 11.81 | 1.99 | 39.19 | 17.36 | 9.57 |
| $d_{36}$ | 33.77 | 41.71 | 46.62 | 33.78 | 41.76 | 46.60 |

|  | $\theta_{gF}$ | $\theta_{gF}$-formula (6) |
|---|---|---|
| $n_{d13}$, $n_{d17}$ | 0.537 | 0.033 |
| $n_{d15}$ | 0.534 | 0.054 |
| $n_{d18}$ | 0.668 | 0.060 |

Figure 4A:
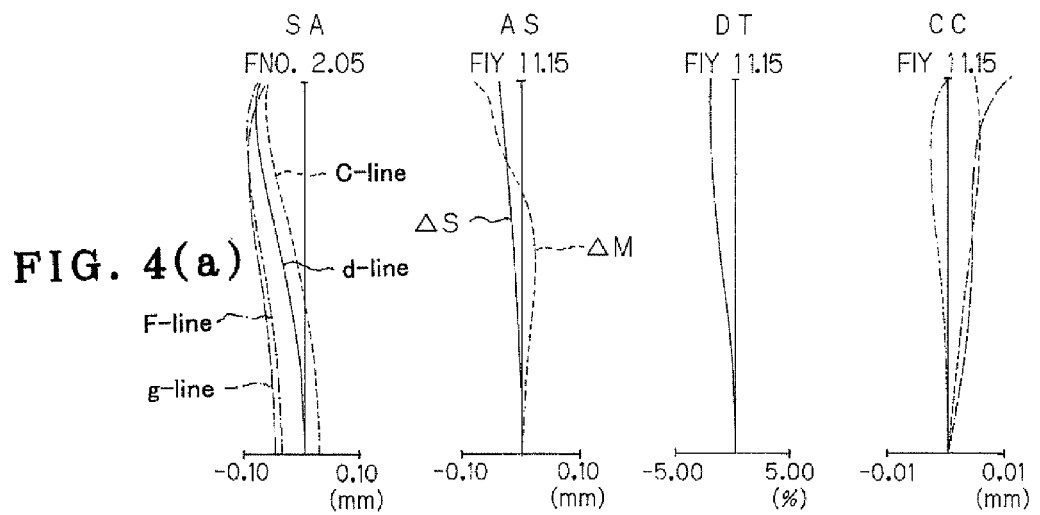
FIG. 4 is an aberration diagram for Example 1 upon focusing on an object point at infinity.
Figure 4B:
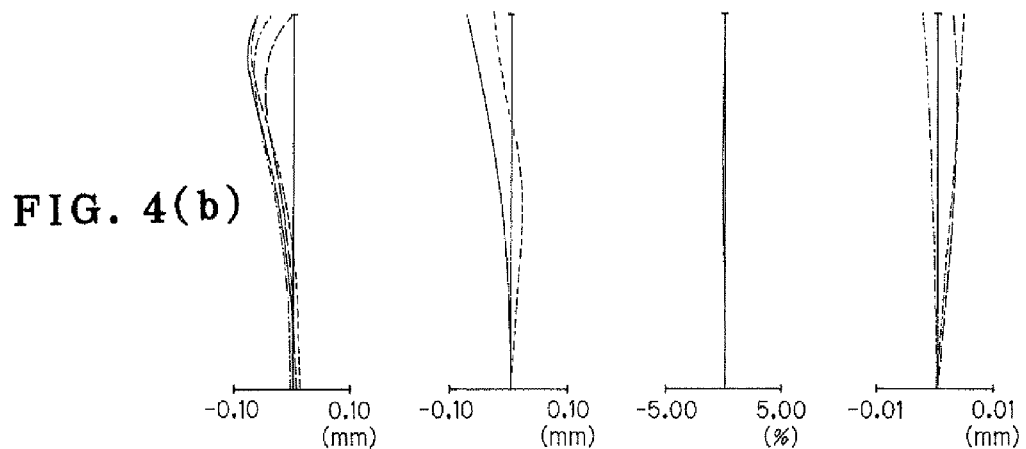
Figure 4C:
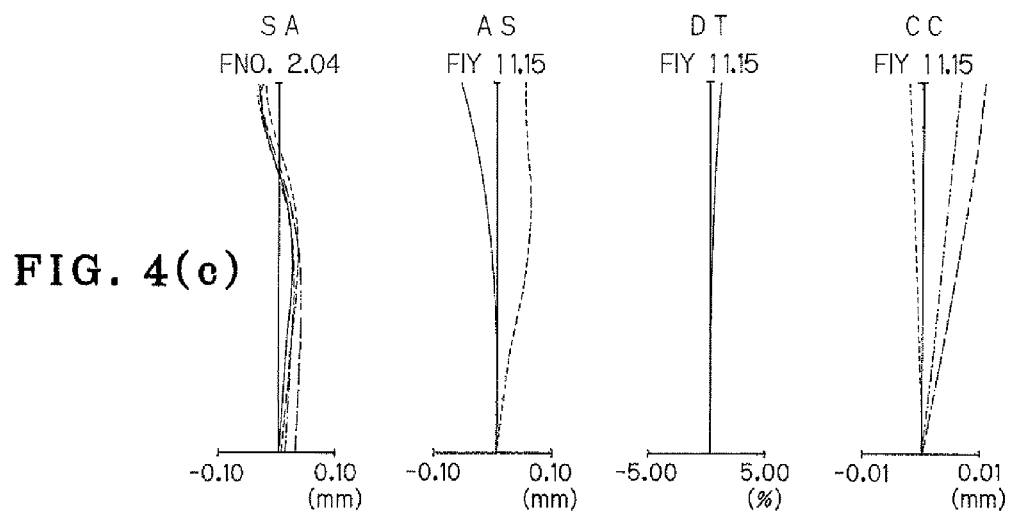
Figure 5A:
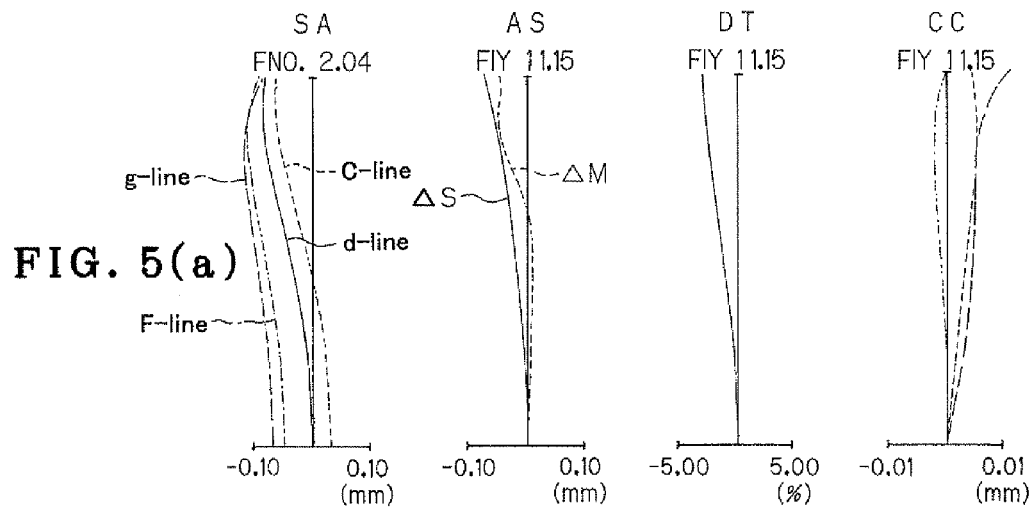
FIG. 5 is an aberration diagram for Example 1 upon focusing on a subject distance of 75 cm.
Figure 5B:
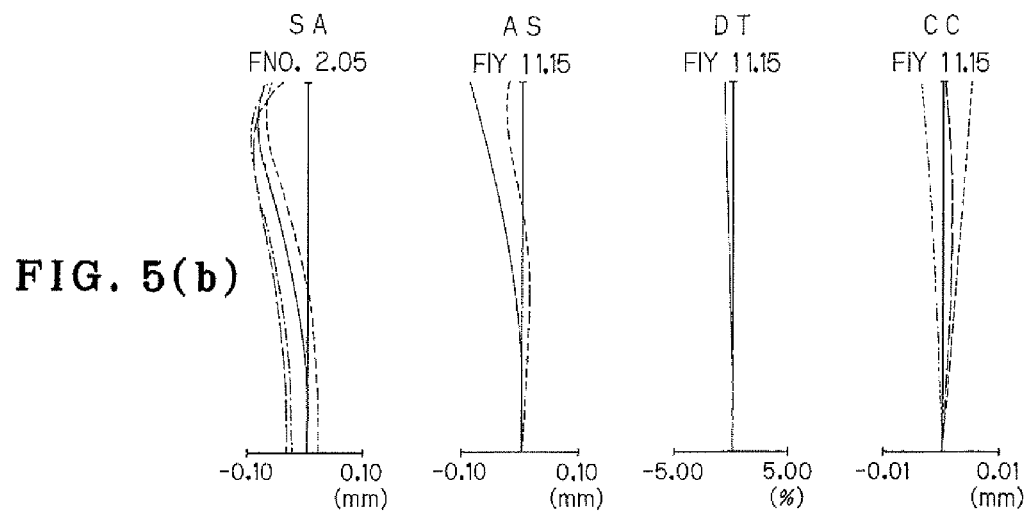
Figure 5C:
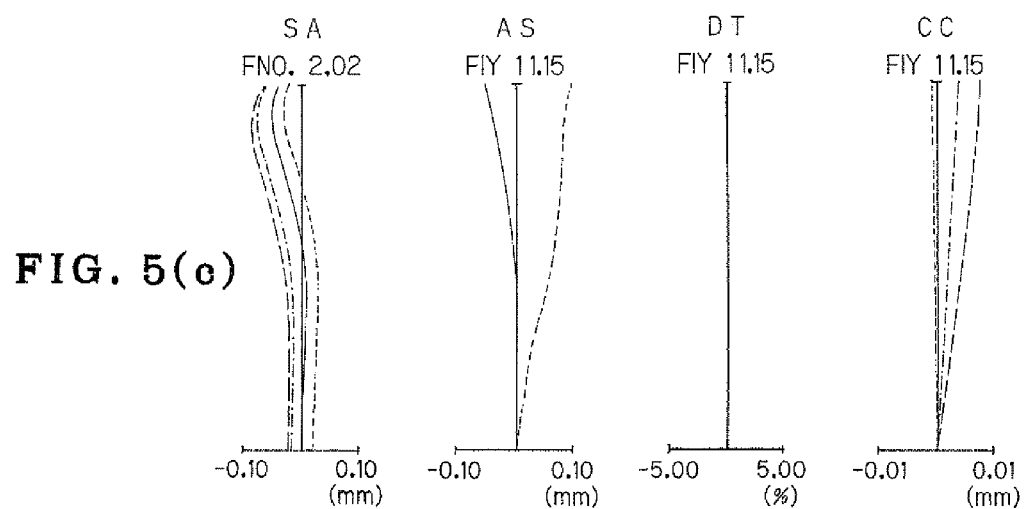
Figure 6A:
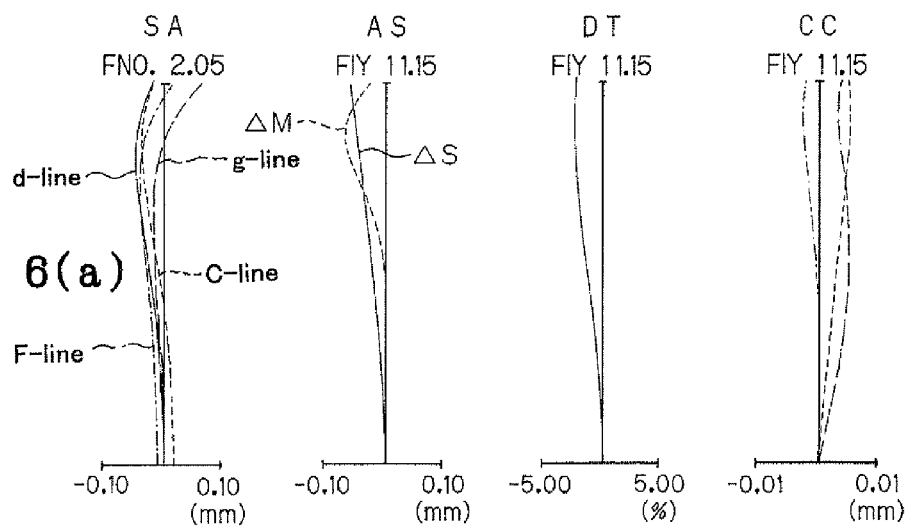
FIG. 6 is an aberration diagram for Example 2 upon focusing on an object point at infinity.
Figure 6B:
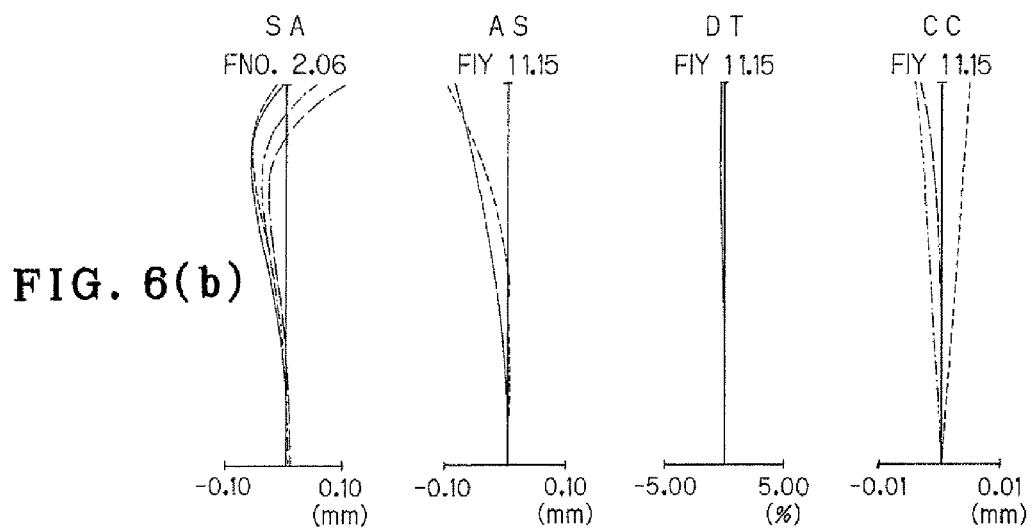
Figure 6C:
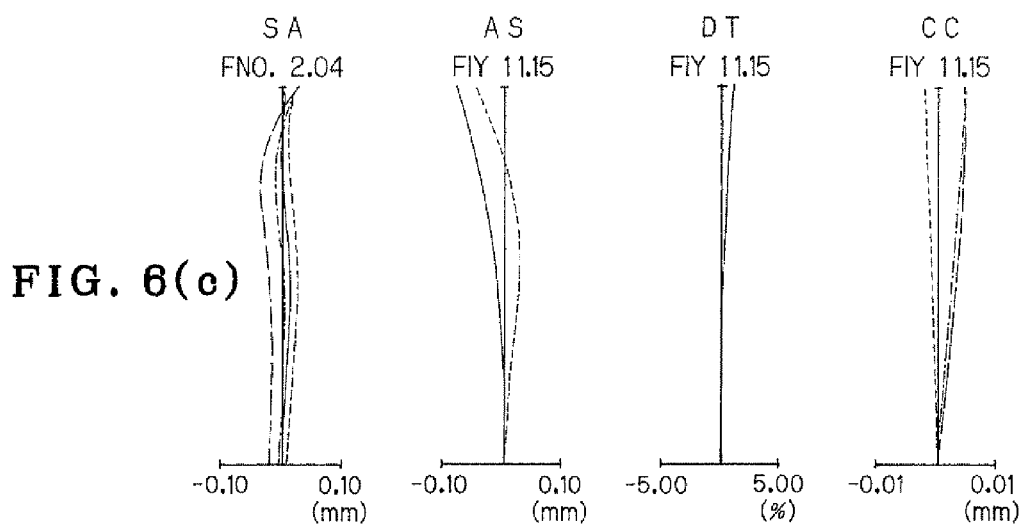
Figure 7A:
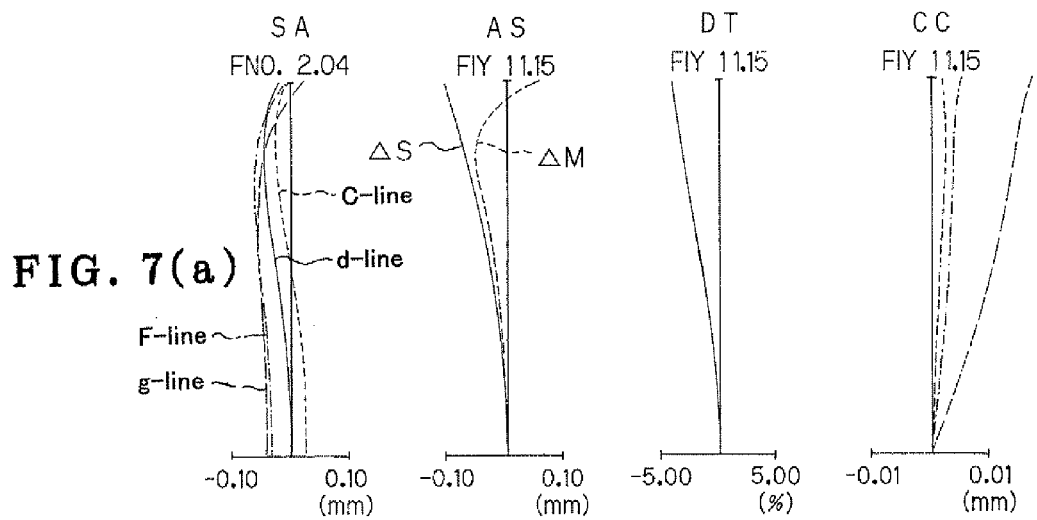
FIG. 7 is an aberration diagram for Example 2 upon focusing on an subject distance of 37 cm.
Figure 7B:
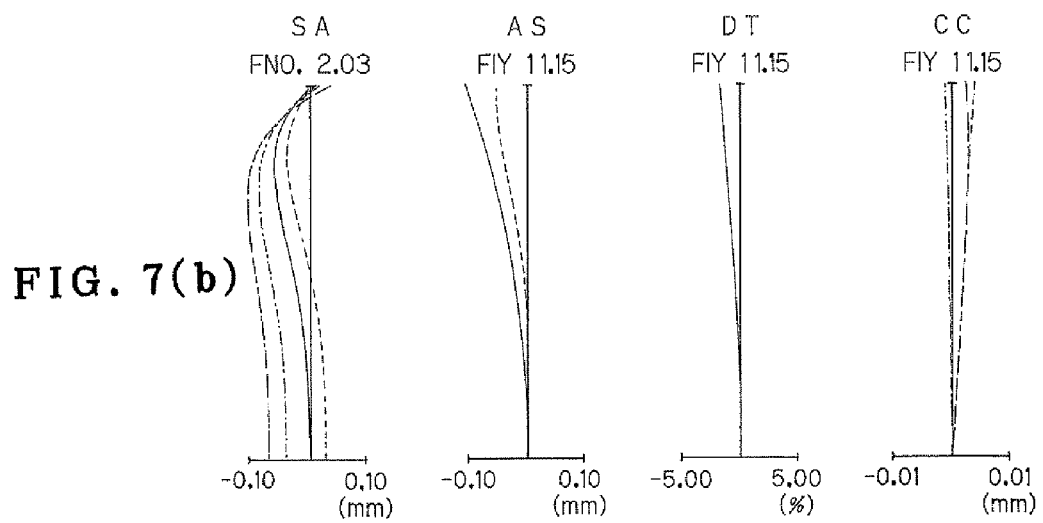
Figure 7C:
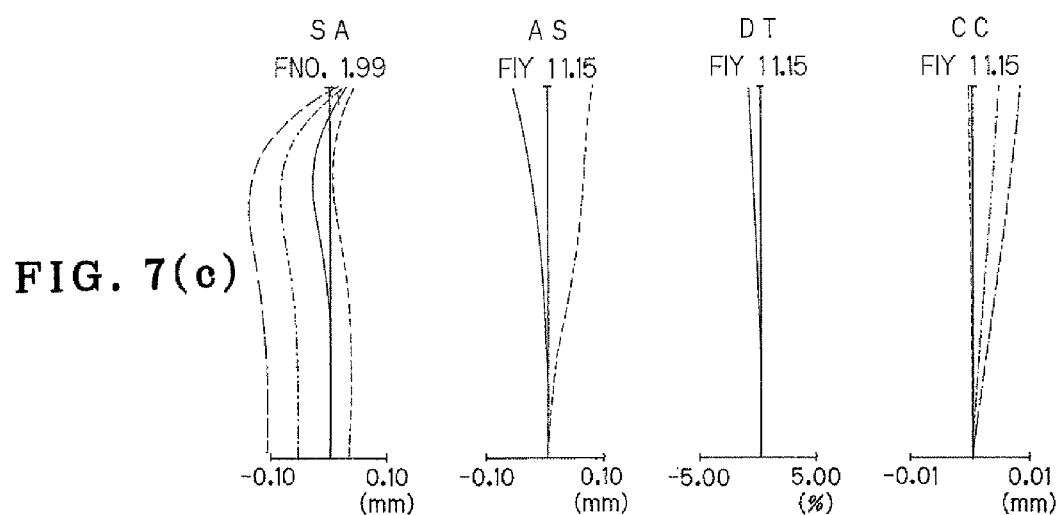
Figure 8A:
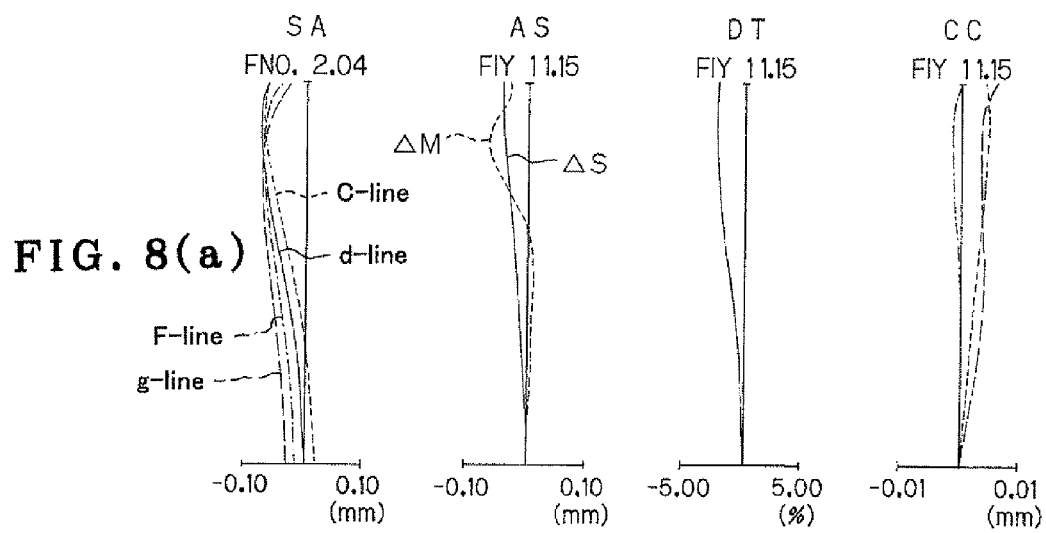
FIG. 8 is an aberration diagram for Example 3 upon focusing on an object point at infinity.
Figure 8B:
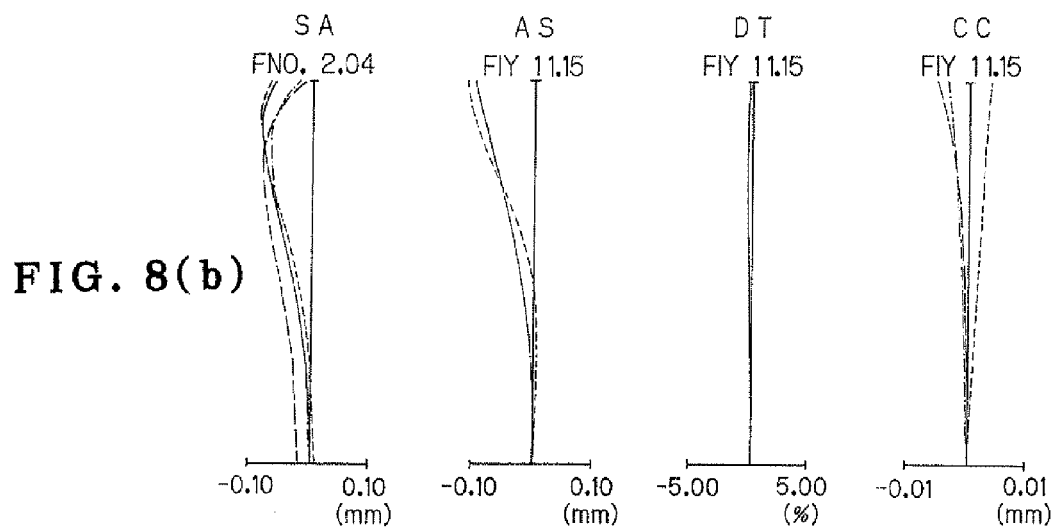
Figure 8C:
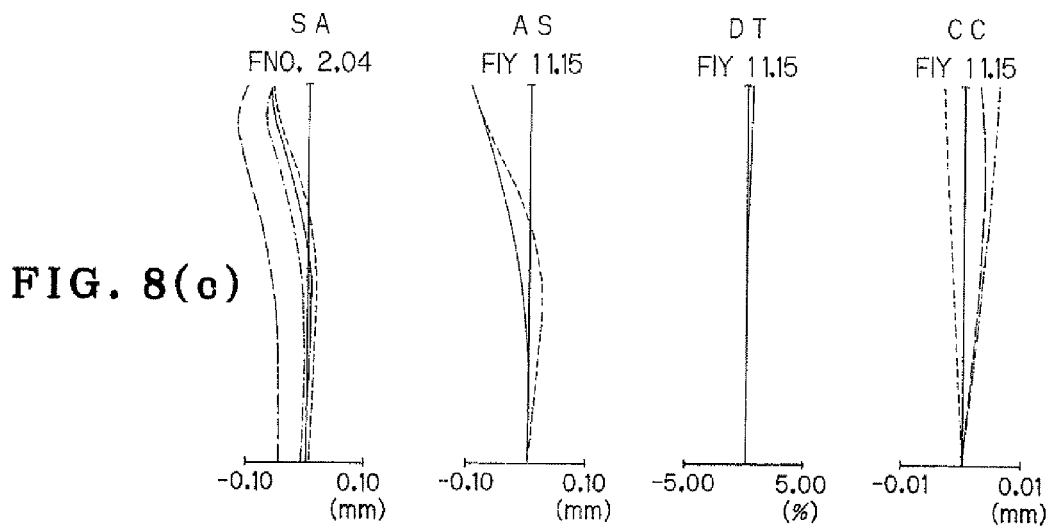
Figure 9A:
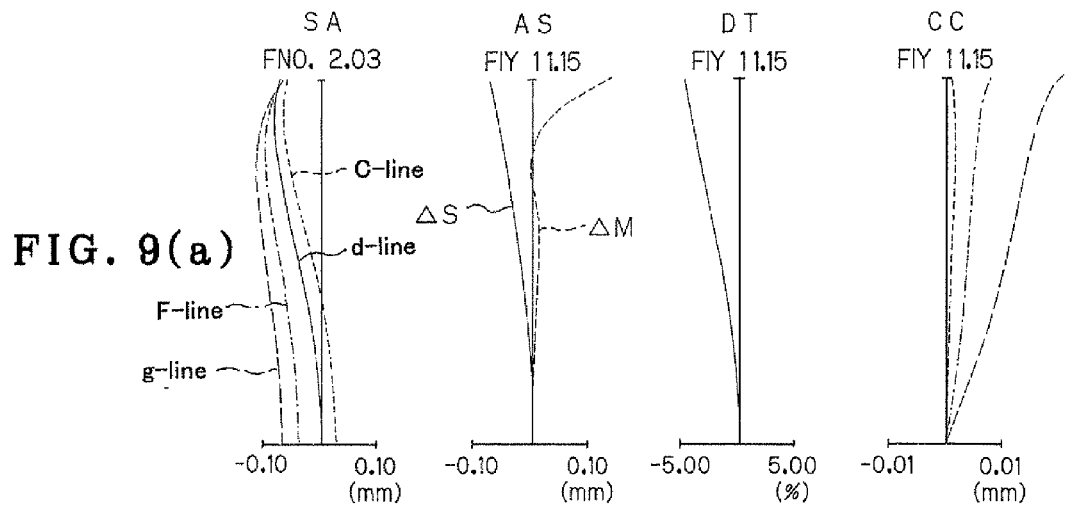
FIG. 9 is an aberration diagram for Example 3 upon focusing on a subject distance of 35 cm.
Figure 9B:
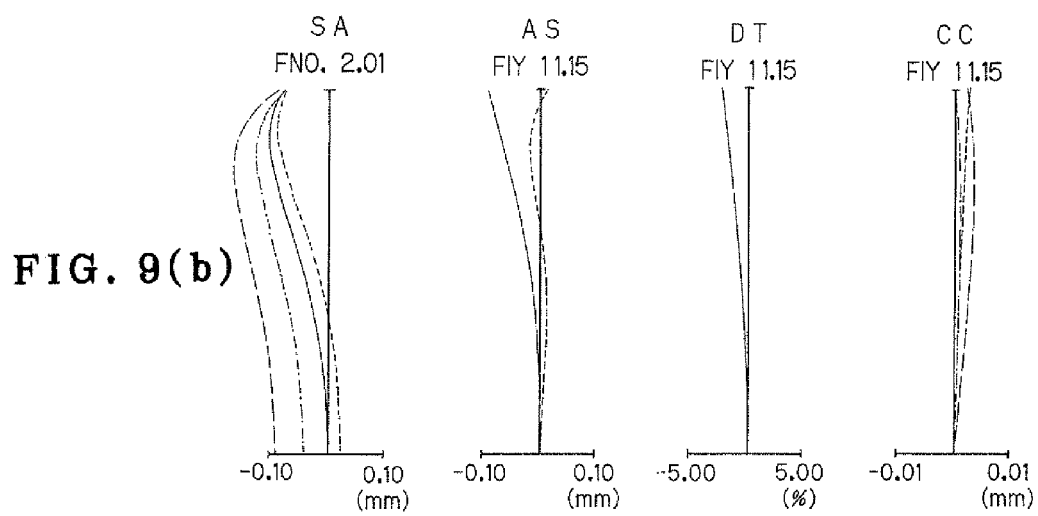
Figure 9C:
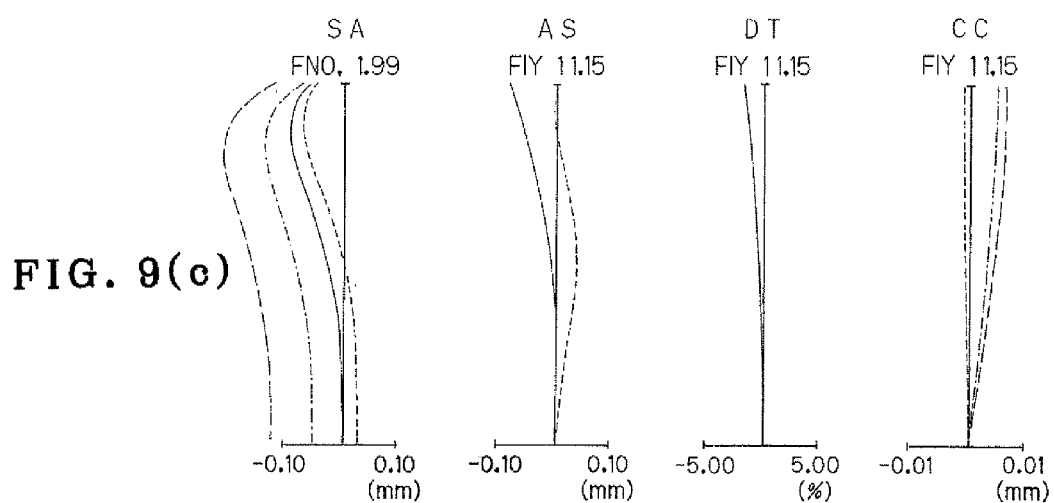

FIGS. 4 and 5 are aberration diagrams for Example 1 upon focusing on an object point at infinity and a close-range object at a subject distance of 75 cm, respectively. Shown in these aberration diagrams are spherical aberration (SA), astigmatism (AS), distortion (DT) and chromatic aberration of magnification (CC) at the wide-angle end (a), in the intermediate state (b), and at the telephoto end (c), respectively, with "FIY" representing the maximum image height (mm). Similar aberration diagrams for Examples 2 and 3 are shown in FIGS. 6 and 7 (upon focusing on a close-range object at a subject distance of 37 cm) and FIGS. 8 and 9 (upon focusing on a close-range object at a subject distance of 35 cm), respectively.

Figure 10:
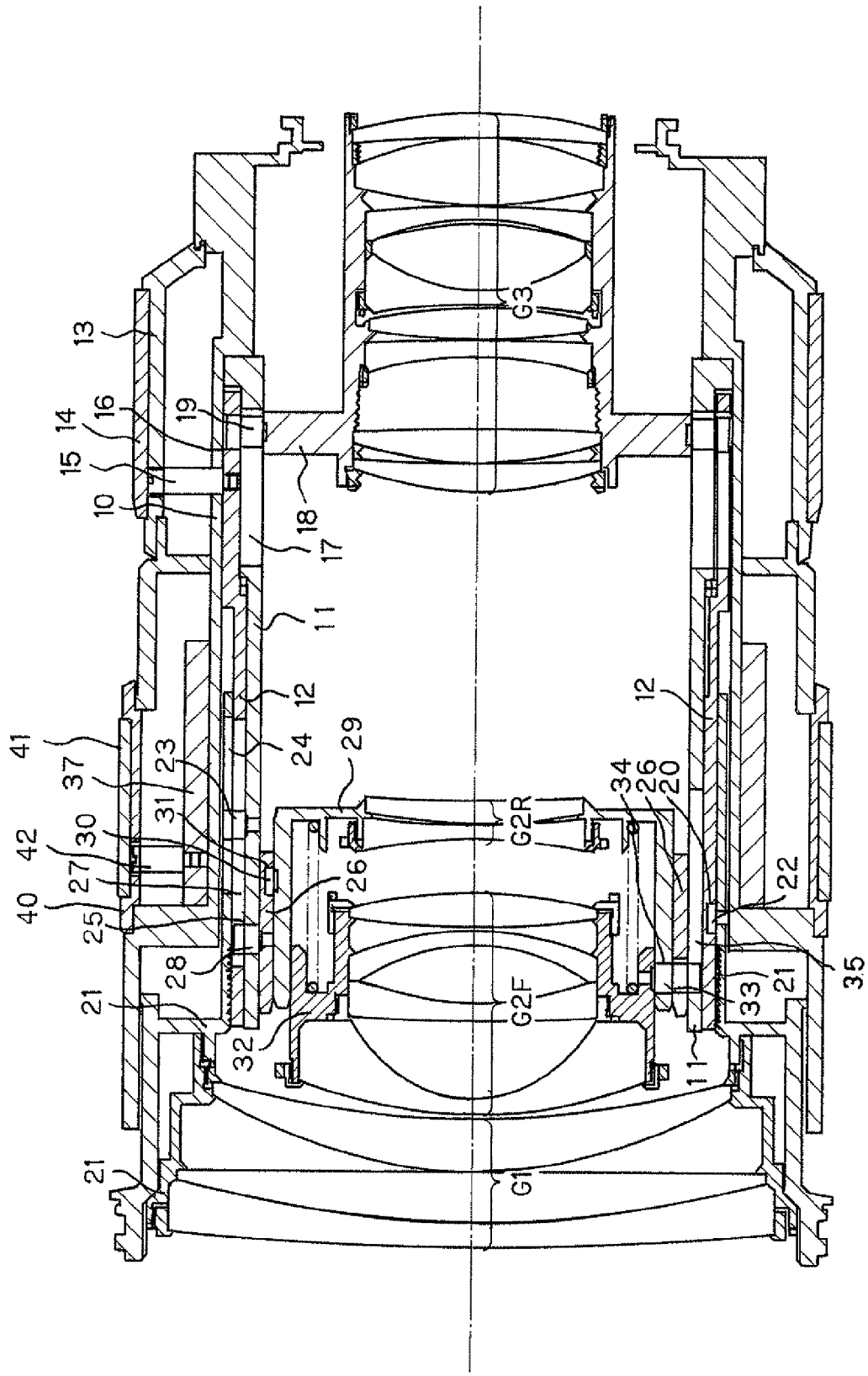
FIG. 10 is illustrative in section including the optical axis of one example of the lens barrel used with the zoom lens of the invention.

One example of the lens barrel used with the inventive zoom lens is now explained. FIG. 10 is illustrative in section including the optical axis of the lens barrel here, and FIG. 11 is illustrative in section including the optical axis of a barrel portion for the second (lens) group at an angular position different from that of FIG. 10. It is here noted that this lens barrel comprises a zooming mechanism and a focusing mechanism for the zoom lens.

The lens barrel here embodies a zoom lens's zooming mechanism to be attached to cameras, digital cameras or the like. A fixed frame 11 is attached to an inner housing 10 forming a part of the barrel body, and a cam frame 12 rotatable about the optical axis is located around that. And as a zoom annulus 13 located near the rear end of the lens barrel and having a zoom rubber 14 wound around it is rotated, it causes rotation of a zoom pin 15 fixed inside of the zoom annulus 13. The end of the zoom pin 15 is planted in the cam frame 12, so that the cam frame 12 rotates together with the zoom annulus 13.

First, reference is made to the zooming mechanism for the third (lens) group that is implemented by the rotation of the zoom annulus 13.

The cam frame 12 is provided in it with a third group cam groove 16 for moving the third group, the fixed frame 11 positioned inside the cam frame 12 is provided in it with a third group key groove 17 running in the optical axis direction, and a third group cam pin 19 planted in a third group frame 18 in the fixed frame 11 is in engagement within the third group key groove 17 in the fixed frame 11 and the third group cam groove 16 in the cam frame 12.

Accordingly, as the zoom annulus 13 rotates, it permits the cam frame 12 to rotates so that the third group frame 18 moves along the locus of the third group cam groove 17 in the cam frame 12 in the optical axis direction.

Then, reference is made to the zooming mechanism for the first (lens) group that is implemented by the rotation of the zoom annulus 13.

The cam frame 12 is provided in it with a first cam groove 20 for moving the first group, and an inwardly extending first cam pin 11 is planted in a first group frame 21 with its end in engagement within the first cam groove 20 in the cam frame 12.

On the other hand, the fixed frame 11 is planted with a straightforward first group pin 23, and the end of that first group pin 23 is in engagement by way of the opening in the cam frame 12 within a first group key groove 24 provided in the first group frame 21 and running in the optical axis direction.

Accordingly, the first group frame 21 is kept against rotation by the engagement of the first straight-forward pin 23 within the first group key groove 24, but as the cam frame 13 rotates, it moves along the locus of the first group cam groove 20 in the cam frame 12 in the optical axis direction.

Then, reference is made to the zooming mechanism for the second (lens) group that is implemented by the rotation of the zoom annulus 13.

The fixed frame 11 is provided in it with a second group cam groove 25 for moving a second group zoom frame 26 in the optical axis direction while rotating it, the came frame 12 is provided in it with a second group key groove 27 that intersects that second group cam groove 25 and runs in the optical axis direction, the second group zoom frame 26 located inside the fixed frame 11 is planted with an outwardly extending second cam pin 28, and the end of the second group cam pin 28 is in engagement by way of the second group cam groove 25 in the fixed frame 11 within the second group key groove 27 provided in the cam frame 12 and running in the optical axis direction.

And a frame 29 for the second group's rear unit is located in the second group zoom frame 26, and an outwardly extending cam pin 30 for the second group's rear unit is planted in the frame 29 for the second group's rear unit, with its end in engagement within a cam groove 31 for the second group's rear unit that is located in the second group zoom frame 26.

A frame 32 for the second group's front unit is located within the frame 29 for the second group's rear unit, an outwardly extending cam pin 33 for the second group's front unit is planted in the frame 32 for the second group's front unit, and the cam pin 33 for the second group's front unit has its end in engagement within a key groove 35 located in the fixed frame 11 and running in the optical axis direction by way of a cam groove 34 for the second group's front unit located in the frame 29 for the second group's rear unit and the opening in the second group zoom frame 26.

A key groove 36 for the second group's rear unit running in the optical axis direction is located in the frame 29 for the second group's rear unit, and a distance lever 38 fixed to a distance frame 37 and extending in the optical axis direction is in engagement within that key groove 36 for the second group's rear unit so that the frame 29 for the second group's rear unit is movable only in the optical axis direction under the action of that distance lever 38.

Accordingly, as the cam frame 12 rotates, the second group zoom frame 26 rotates and moves along the locus of the second group cam groove 25 in the optical axis direction under the interaction between the second group key groove 28 provided in the cam frame 12, the second group cam pin 28 provided in the second group zoom frame 27 and the second group cam groove 25 provided in the fixed frame 11. As the second group zoom frame 26 rotates and moves, the frame 29 for the second group's rear unit kept against rotation by the distance lever 38 moves with respect to the second group zoom frame 26 in the optical axis direction under the interaction between the cam pin 30 planted therein for the second group's rear unit and the cam groove 31 for the second group's rear unit provided in the second group zoom frame 27. Consequently, the cam groove 31 for the second group's rear unit moves in the optical axis direction under the actions of both cam grooves, the second group cam groove 25 (provided in the fixed frame 11) and the cam groove 31 for the second group's rear unit (provided in the second group zoom frame 26).

In this case, the frame 32 for the second group's front unit is kept against rotation by the actions of the key groove 35 for the second group's front unit provided in the fixed frame 11 and the cam pin 33 for the second group's front unit planted in the frame 32 for the second group's front unit; there is neither the relative rotation of the frame 32 for the second group's front unit and the frame 29 for the second group's rear unit nor the relative movement of the frame 32 for the second group's front unit and the cam groove 34 for the second group's front unit, making sure the movement of the frame 32 for the second group's front unit together with the frame 29 for the second group's rear unit in the optical axis direction.

Next, reference is made to the focusing mechanism due to a spacing change between the second group's front and rear units implemented by the rotation of a distance annulus 40.

Upon the rotation of the distance annulus 40 located near the front end of the lens barrel and having a distance rubber 41 wound around it, a distance pin 42 fixed to the inside of the distance annulus 40 rotates. A distance pin 42 has its end planted in a distance frame 37 so that the distance frame 37 rotates in unison with the distance annulus 40. As the distance frame 37 rotates, the frame 29 for the second group's rear unit rotates under the actions of the distance lever 38 and the key groove 36 for the second group's rear unit, and the came pin 30 for the second group's rear unit rotates as well. The end of the cam pin 30 for the second group's rear unit is in engagement within the cam groove 31 for the second group's rear unit in the second group zoom frame 26 so that the frame 29 for the second group's rear frame rotates and moves along the locus of the cam groove 31 for the second group's rear unit in the optical axis direction.

The cam groove 34 for the second group's front unit is provided in the frame 29 for the second group's rear unit and the cam pin 33 for the second group's front unit, which is kept against rotation by the key groove 35 for the second group's front unit located in the fixed frame 11, extends through the cam groove 34 for the second group's front unit, so that by the rotation and movement of the frame 29 for the second group's rear unit, the cam pin 33 for the second group's front unit moves relative to the frame 29 for the second group's rear unit in the optical axis direction with the movement of the frame 32 for the second group's front unit relative to the frame 29 for the second group's rear unit.

FIG. 12 is illustrative of the relative positions of the cam grooves 25, 31, 34, the key grooves 27, 35 and the cam pins 28, 30, 33 all adapted to control the movement of the second group's front and rear units. The positions of the cam pin 33 for the second group's front unit and the cam pin 30 for the second group's rear unit in the directions of the key grooves 27 and 35 define the positions of the second group's front and rear units (the frames 32 and 29 for the second group's front and rear units) in the optical axis direction, respectively. And FIG. 12($a$) is illustrative of a state controlled to an infinite distance at the wide-angle end; FIG. 12($b$) is illustrative of a state controlled from the wide-angle end position of (a) to a short distance position; FIG. 12($c$) is illustrative of a state controlled from the position of (a) to an infinite distance at the telephoto end; and FIG. 12($d$) is illustrative of a state controlled from the telephoto end position of (c) to a short distance position at the telephoto end.

As, in the state of FIG. 12($a$), the distance annulus 40 is rotated to rotate the distance frame 37, the frame 29 for the second group's rear unit rotates under the action of the distance lever 38, and the cam pin 30 for the second group's rear unit planted in the frame 29 for the second group's rear unit moves along the cam groove 31 for the second group's rear unit in the second group zoom frame 26, as depicted in FIG. 12($b$) with the result that the frame 29 for the second group's rear unit rotates and moves. With this, the cam groove 34 for the second group's front unit provided in the frame 29 for the second group's rear unit, too, rotates and moves from a broken line position to a solid line position. Upon the rotation and movement of the cam groove 34 for the second group's front unit, the cam pin 33 for the second group's front unit located at the position of intersection of the key grooves 35 and 34 for the second group's front and rear units provided in the fixed frame 11 moves too. Accordingly, the second group's front and rear units (the frames 32 and 29 for the second group's front and rear units) move by a given distance in the optical axis direction while their spacing varies relatively.

Figure 12A:
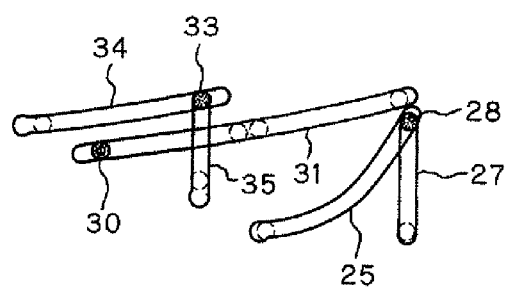
FIG. 12 is illustrative of relative positions of the cam groove, key groove and cam pin for controlling the front and rear units of the second group in the lens barrel in the example of FIG. 10.
Figure 12B:
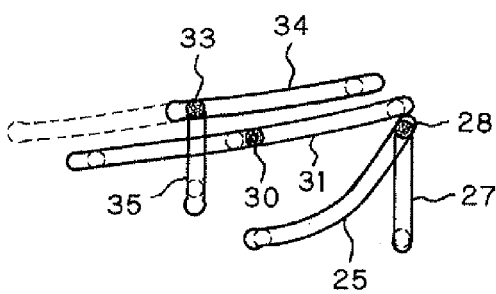
Figure 12C:
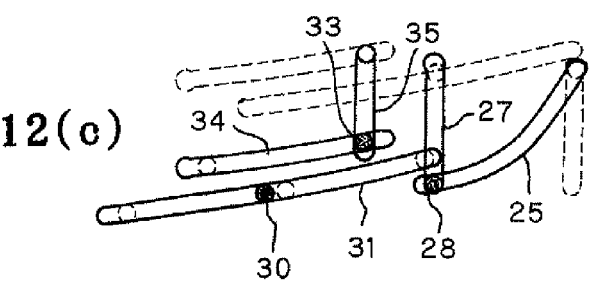
Figure 12C:
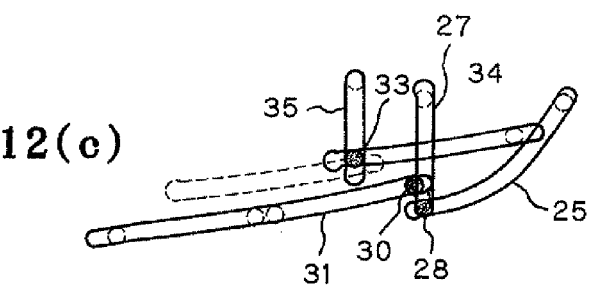

On the other hand, as, in the state of FIG. 12(a), the zoom annulus 13 is rotated to rotate the cam frame 12, the second group key groove 27 rotates from a broken line position to a solid line position, as depicted in FIG. 12(c), and the second group cam pin 28 located at the position of intersection with the second group cam groove 25 provided in the fixed frame 11 rotates and moves, and the second group zoom frame 26 with the second group cam pin 28 planted in it rotates and moves too. With this, the cam groove 31 for the second group's rear unit provided in the second group zoom frame 26, too, rotates and moves from a broken line position to a solid line position. Upon the rotation and movement of the cam groove 31 for the second group's rear unit, the cam pin 30 for the second group's rear unit in engagement within it moves relatively along the cam groove 31 for the second group's rear unit because the distance lever 38 acts as a key, and the cam pin 30 for the second group's rear unit moves by a given distance along the optical axis direction under the action of both cam grooves, the second group cam groove 25 and the cam groove 31 for the second group's rear unit. As the cam pin 30 for the second group's rear unit moves in the optical axis direction, the frame 29 for the second group's rear unit planted in it moves together with the cam groove 34 for the second group's front unit from a broken line position to a solid line position. Thus, the cam pin 33 for the second group's front unit located at the position of intersection of the key groove 35 for the second group's front unit and the cam groove 34 for the second group's front unit provided in the fixed frame 11, too, moves the same distance in the same direction as the cam pin 30 for the second group's rear unit. Consequently, the front and rear units of the second group (the frames 32 and 29 for the second group's front and rear frames), while they are kept at a given distance, move by a given distance in the optical axis direction under the action of both cam grooves, the second groove cam groove 25 and the cam groove 31 for the second group's rear unit.

As, in the state of FIG. 12(c), the distance annulus 40 is rotated to rotate the distance frame 37, the frame 29 for the second group's rear unit rotates under the action of the distance lever 38, and the cam pin 30 for the second group's rear unit planted in the frame 29 for the second group's rear unit moves along the cam groove 31 for the second group's rear unit in the second group zoom frame 26, as depicted in FIG. 12(d), with the result that the frame 29 for the second group's rear unit rotates and moves. With this, the cam groove 34 for the second group's front unit provided in the frame 29 for the second group's rear unit, too, rotates and moves from a broken line position to a solid line position. Upon the rotation and movement of the cam groove 34 for the second group's front unit, the cam pin 33 located at the position of intersection of the key groove 35 and cam groove 34 for the second group's front unit provided in the fixed frame 11 moves too. Consequently, the second group's front and rear units (the frames 32 and 29 for the second group's front and rear units) move by a given distance in the optical axis direction while their spacing varies relatively.

While the inventive zoom lens and the lens barrel for it have been described with reference to the specific embodiments, it is contemplated that the invention is never limited to them, and so may be modified in various fashions.

What we claim is:

1. A lens barrel that is used with a zoom lens capable of focusing on a short distance subject by moving two mutually adjoining lens groups with a change in a space between them yet in a varying amount in an optical axis direction depending on a zooming position, characterized by comprising:
    a means for rotating and moving a zoom frame in an optical axis direction upon zooming,
    a first lens group cam groove provided in said zoom frame,
    a first lens group frame that is integral with a first lens group cam pin that moves in engagement within the first lens group cam groove,
    a first keep means for keeping said first lens group frame against rotation about an optical axis,
    a second lens group cam groove provided in said first lens group frame,
    a second lens group frame that is integral with a second lens group cam pin that moves in engagement within said second lens group cam groove, and
    a second keep means for keeping said second lens group frame against rotation about the optical axis, and further comprising a focusing means that rotates said first keep means about the optical axis to rotate said first lens group frame about the optical axis.

* * * * *